Figure 8:
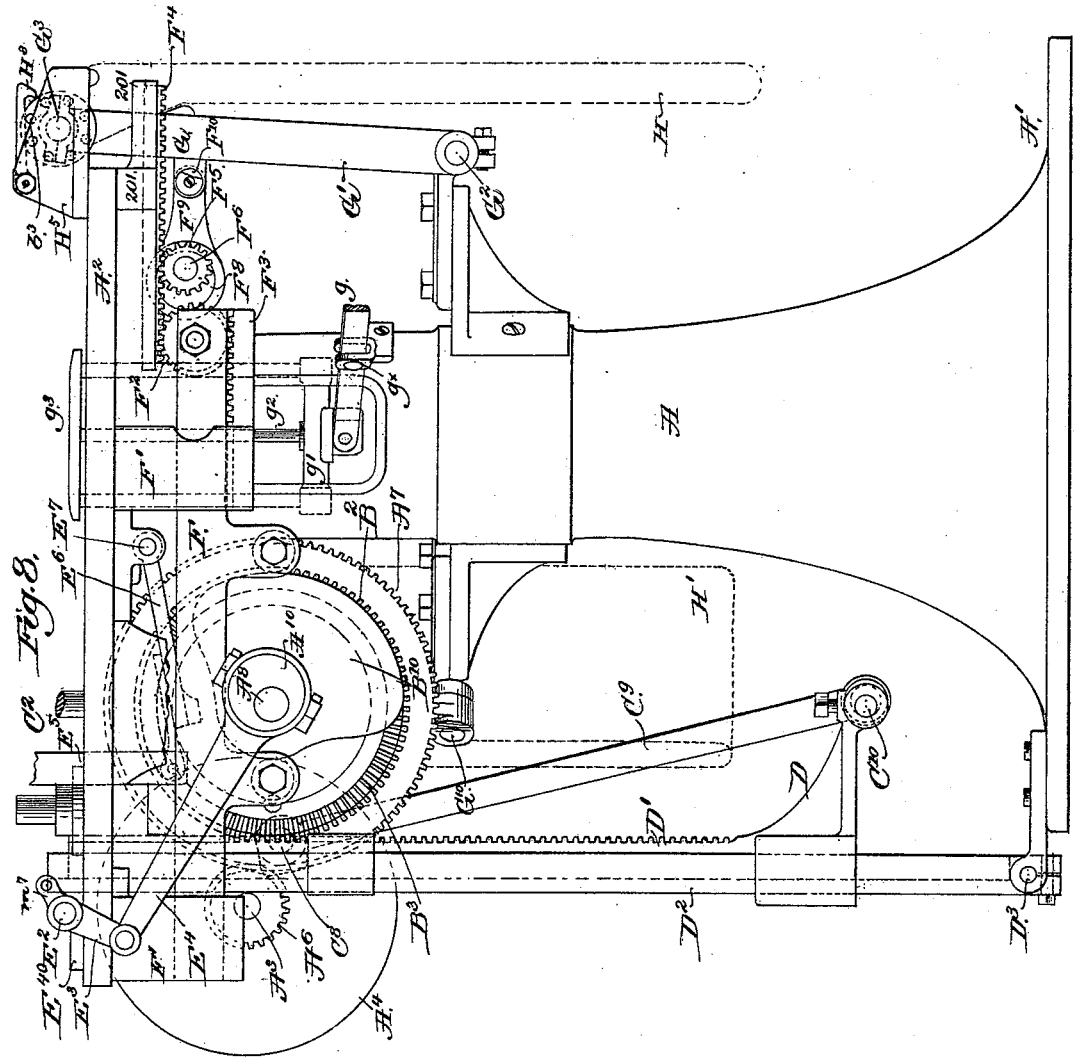

(No Model.) 14 Sheets—Sheet 1.
A. T. GIFFORD & C. H. FRENCH.
CIRCULAR KNITTING MACHINE.
No. 438,685. Patented Oct. 21, 1890.
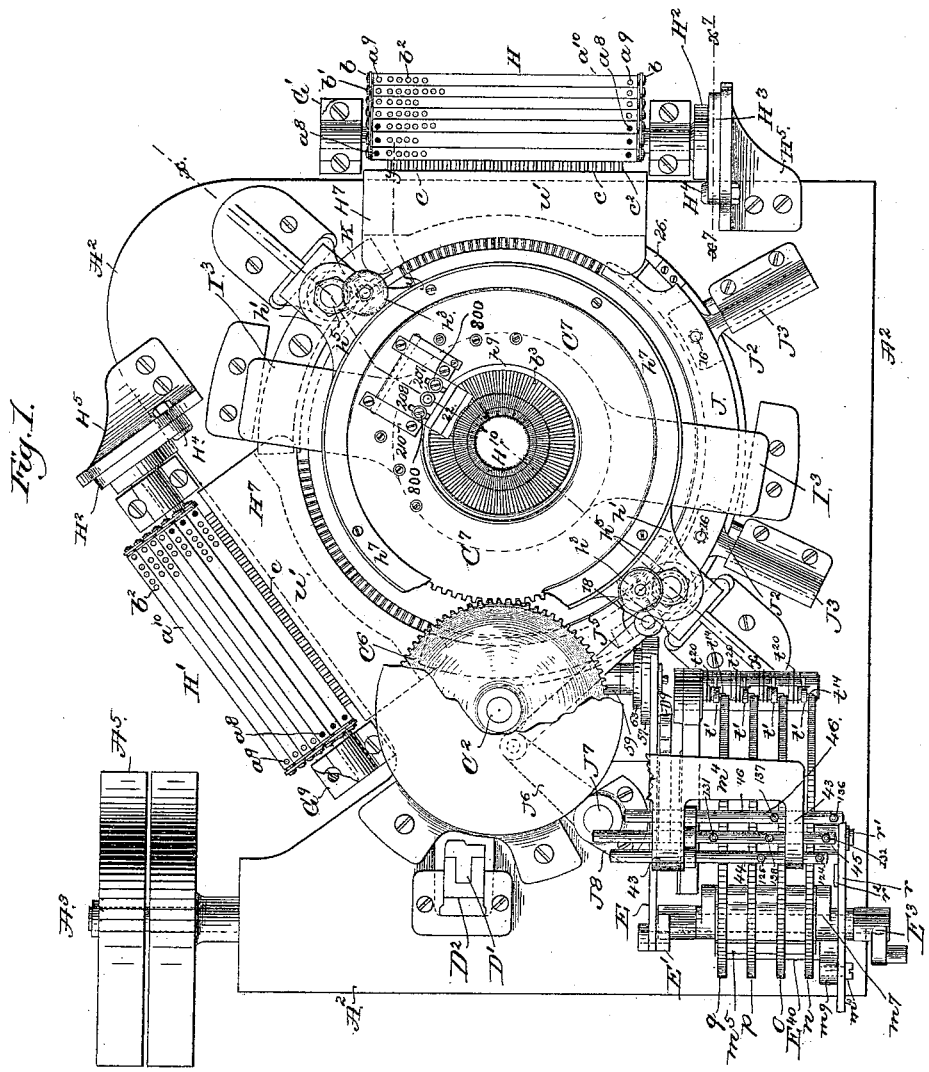
Fig. I.
Witnesses:
J. A. Rennie.
John F. C. Prindlroth
Inventors
Alonzo T. Gifford
C. Hermon French
By Crosby & Gregory attys
THE NORRIS PETERS CO., PHOTO-LITHO., WASHINGTON, D. C.

(No Model.) 14 Sheets—Sheet 2.
A. T. GIFFORD & C. H. FRENCH.
CIRCULAR KNITTING MACHINE.
No. 438,685. Patented Oct. 21, 1890.
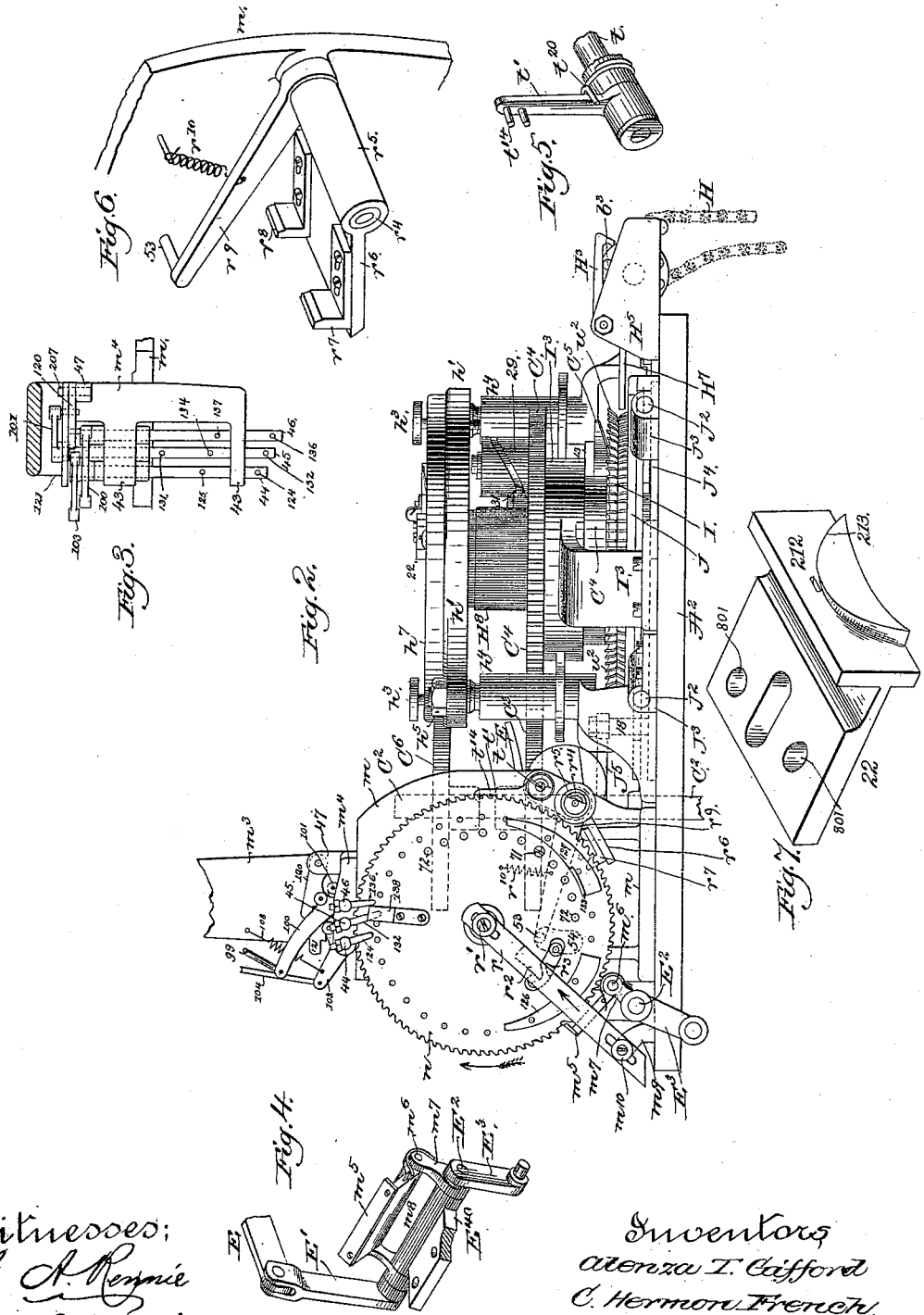

(No Model.) 14 Sheets—Sheet 3.
A. T. GIFFORD & C. H. FRENCH.
CIRCULAR KNITTING MACHINE.

No. 438,685. Patented Oct. 21, 1890.

Witnesses:
Inventors (No Model.) 14 Sheets—Sheet 4.

A. T. GIFFORD & C. H. FRENCH.
CIRCULAR KNITTING MACHINE.

No. 438,685. Patented Oct. 21, 1890.

Witnesses:

Inventors
Alenza T. Gifford
C. Hermon French
By Crosby & Gregory
Attys.

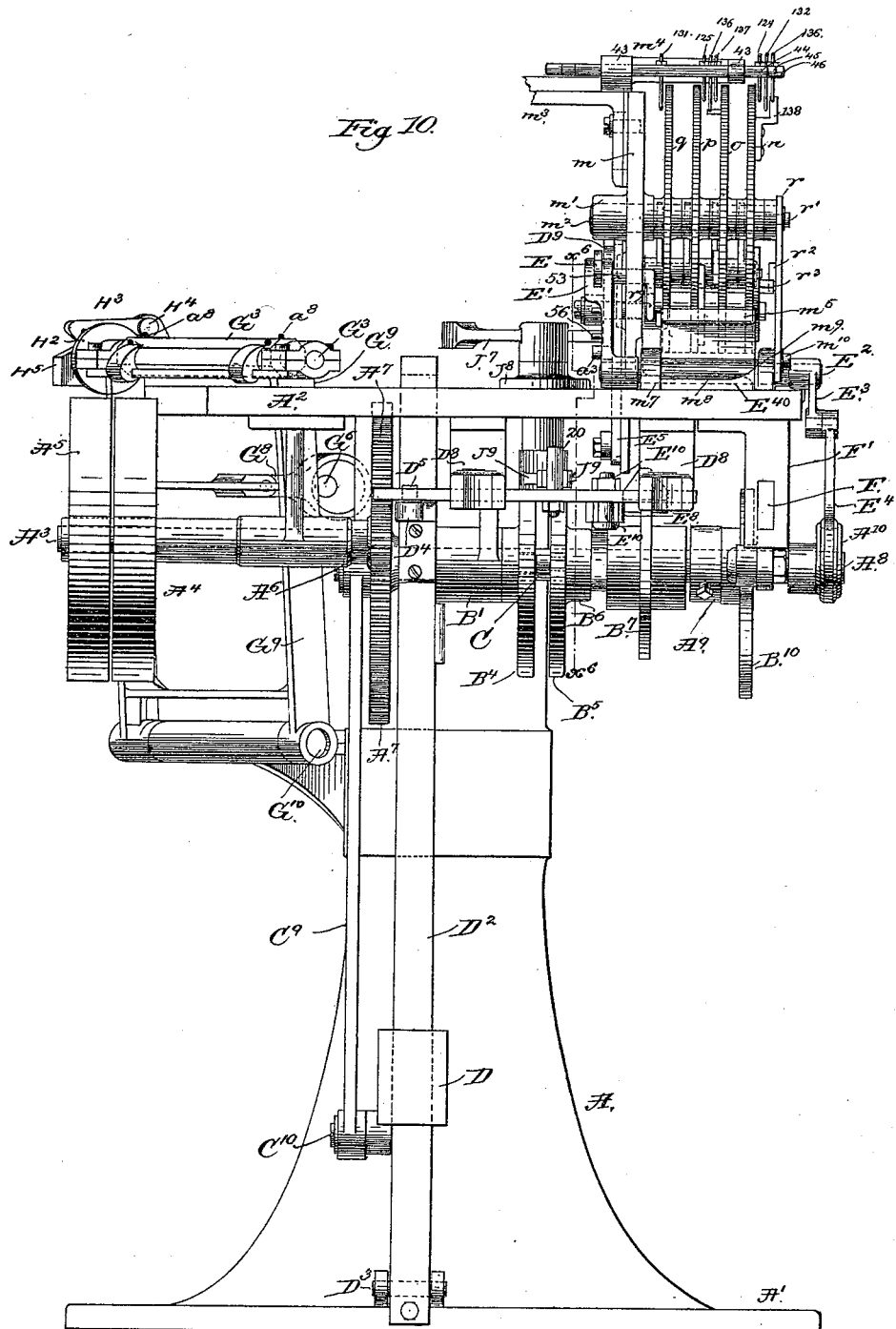

(No Model.) 14 Sheets—Sheet 6.
A. T. GIFFORD & C. H. FRENCH.
CIRCULAR KNITTING MACHINE.
No. 438,685. Patented Oct. 21, 1890.
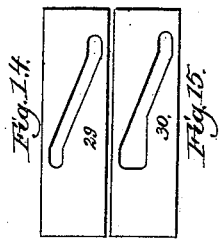
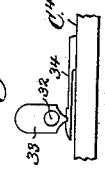
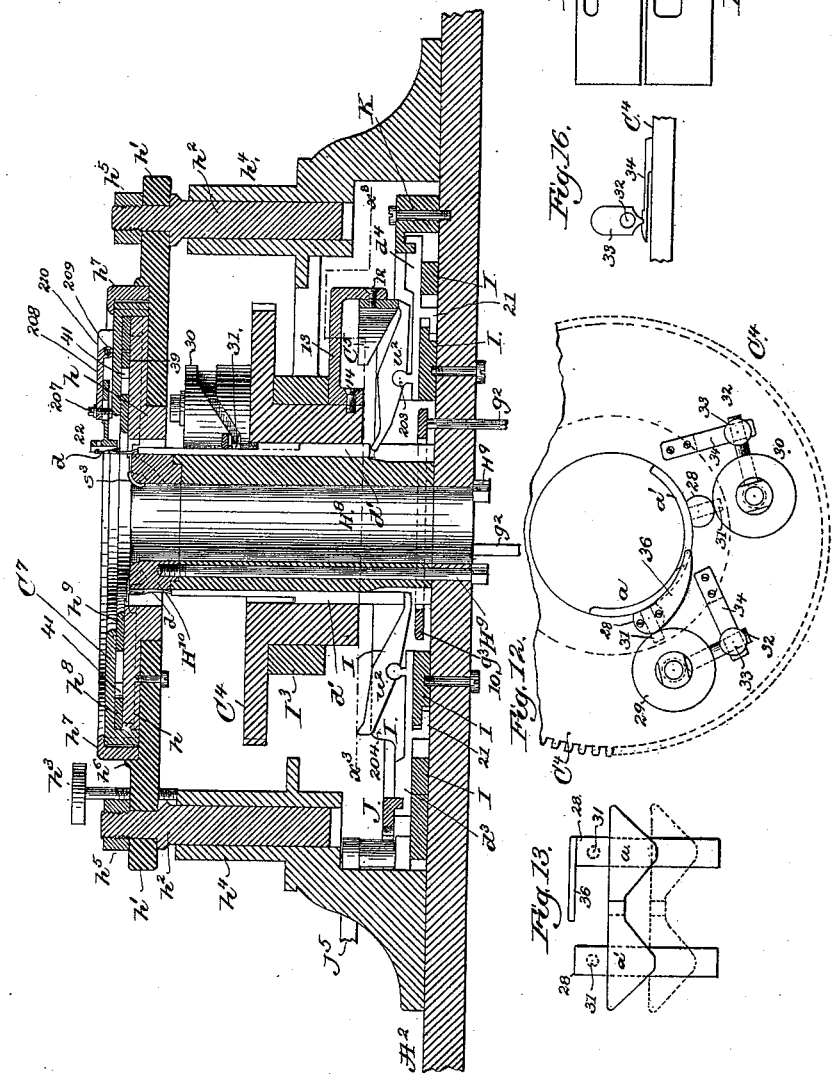
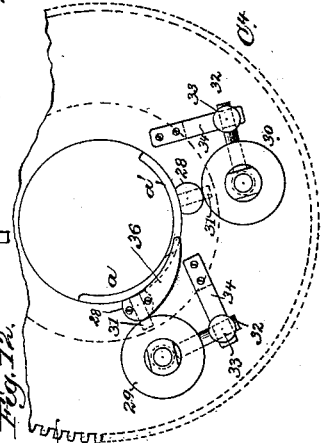
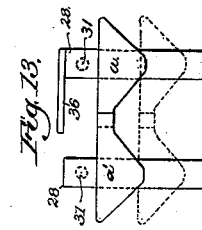
Witnesses:
J. A. Rennie
John F. C. Prindehart
Inventors,
Alonzo T. Gifford
C. Hermon French.
by Crosby & Gregory
Attys.

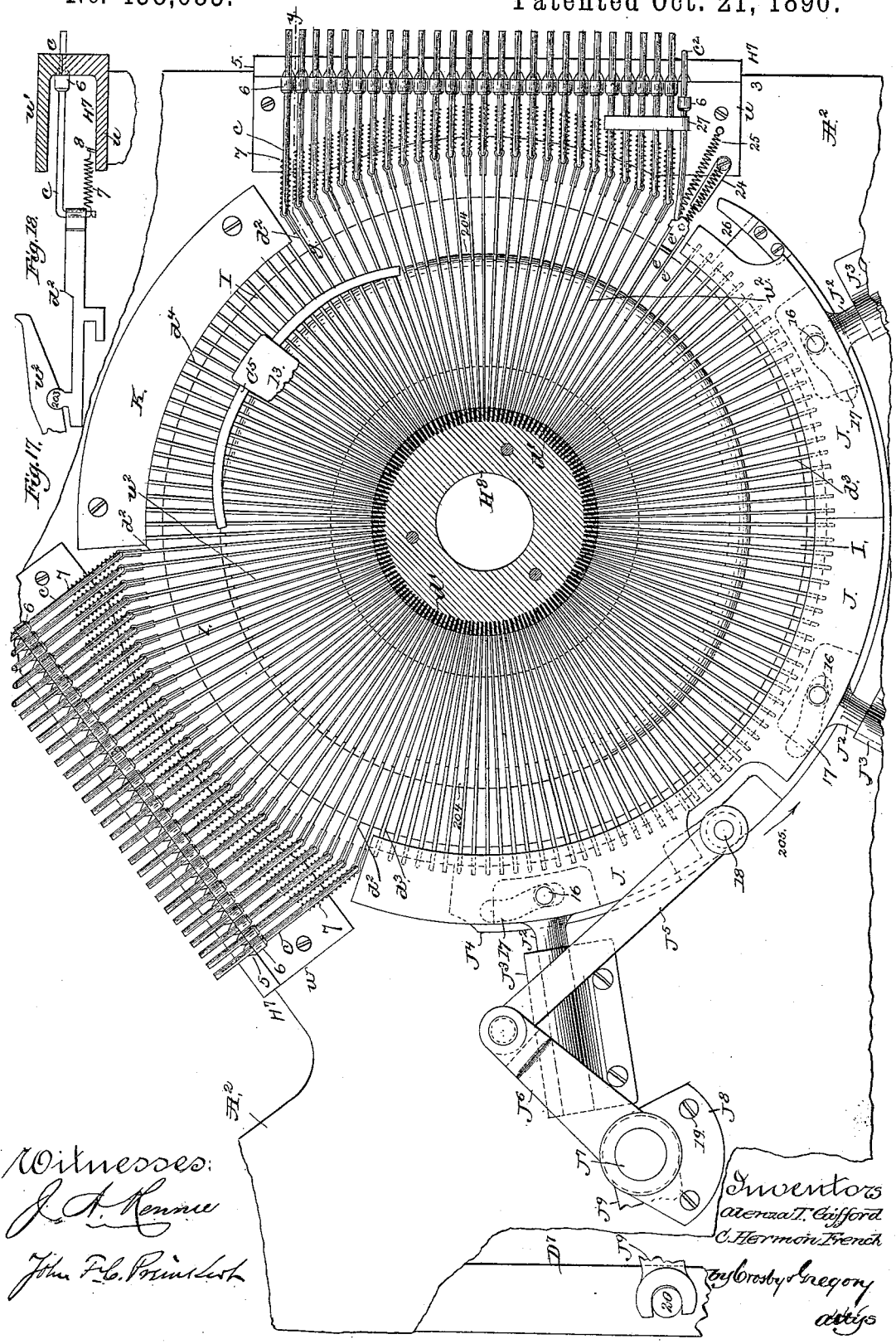

(No Model.) 14 Sheets—Sheet 8.
A. T. GIFFORD & C. H. FRENCH.
CIRCULAR KNITTING MACHINE.
No. 438,685. Patented Oct. 21, 1890.
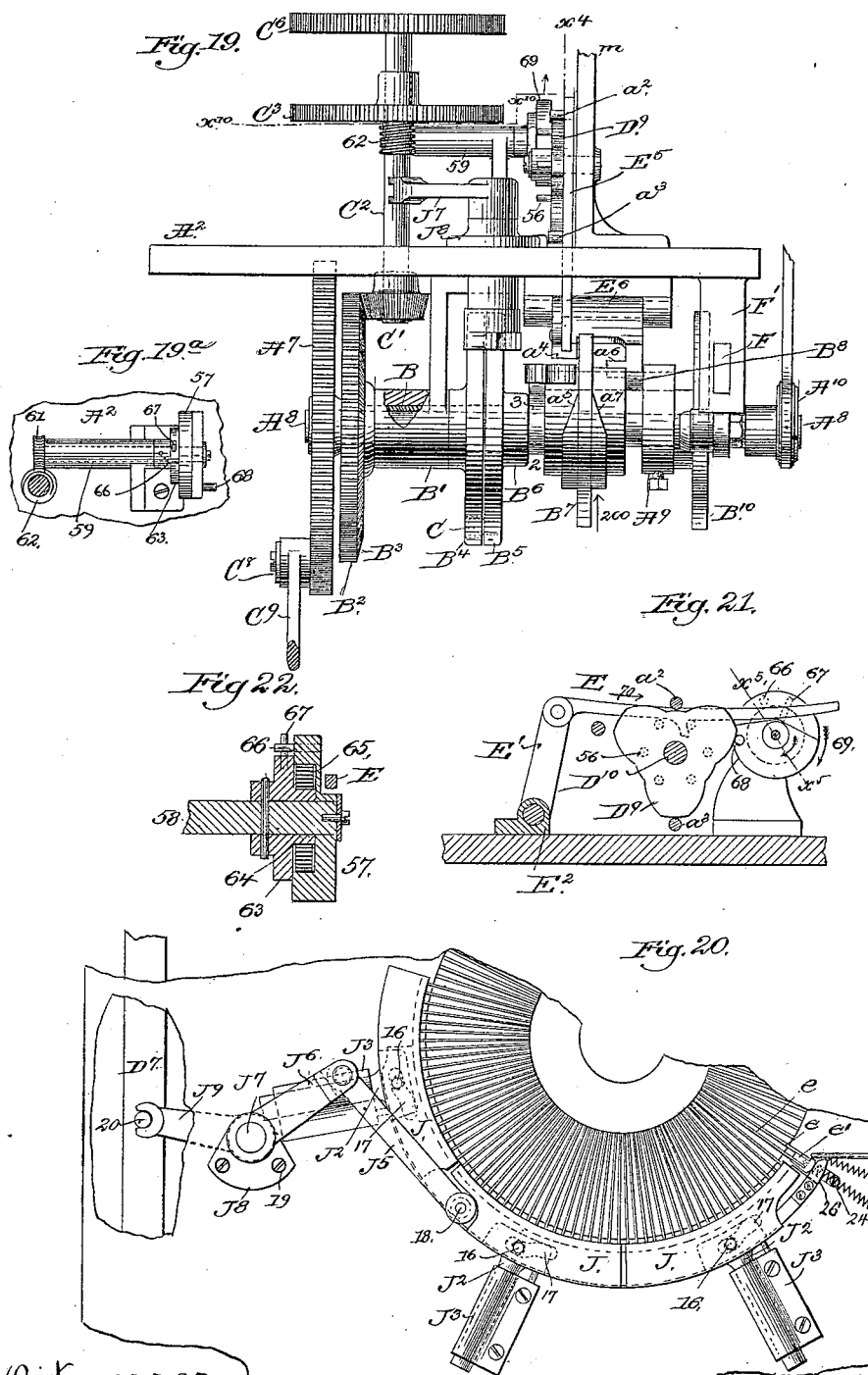

(No Model.) 14 Sheets—Sheet 9.
A. T. GIFFORD & C. H. FRENCH.
CIRCULAR KNITTING MACHINE.
No. 438,685. Patented Oct. 21, 1890.
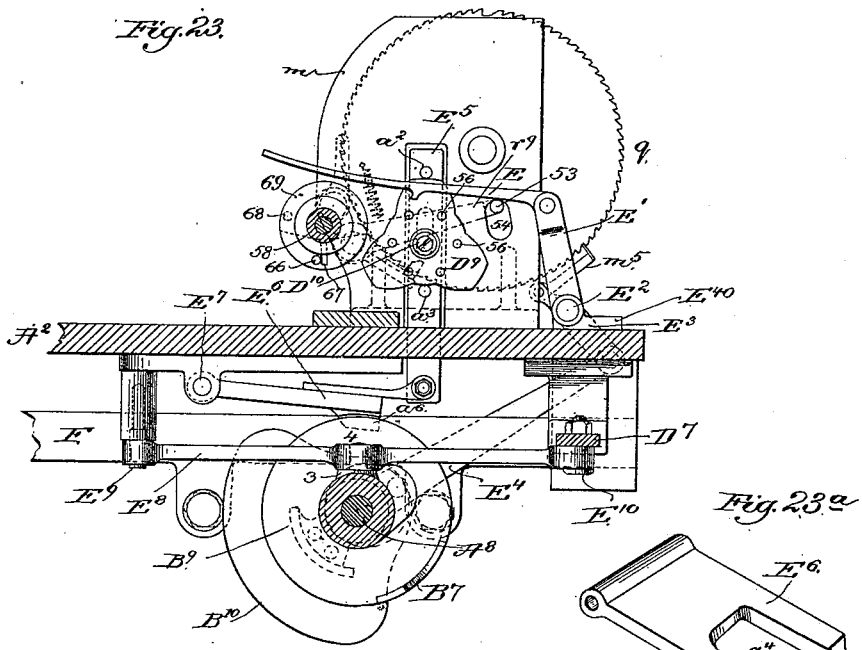
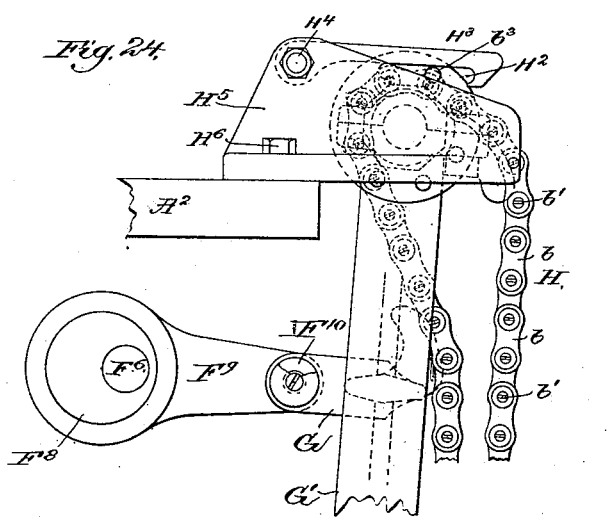
Witnesses:
Inventors
Alenza T. Gifford
C. Hermon French
By Crosby & Gregory
attys.

(No Model.) 14 Sheets—Sheet 10.

A. T. GIFFORD & C. H. FRENCH.
CIRCULAR KNITTING MACHINE.

No. 438,685. Patented Oct. 21, 1890.

Witnesses:
J. A. Rennie
John F. C. Frankfort

Inventors:
Alenza T. Gifford,
C. Hermon French.
by Crosby & Gregory
Attys

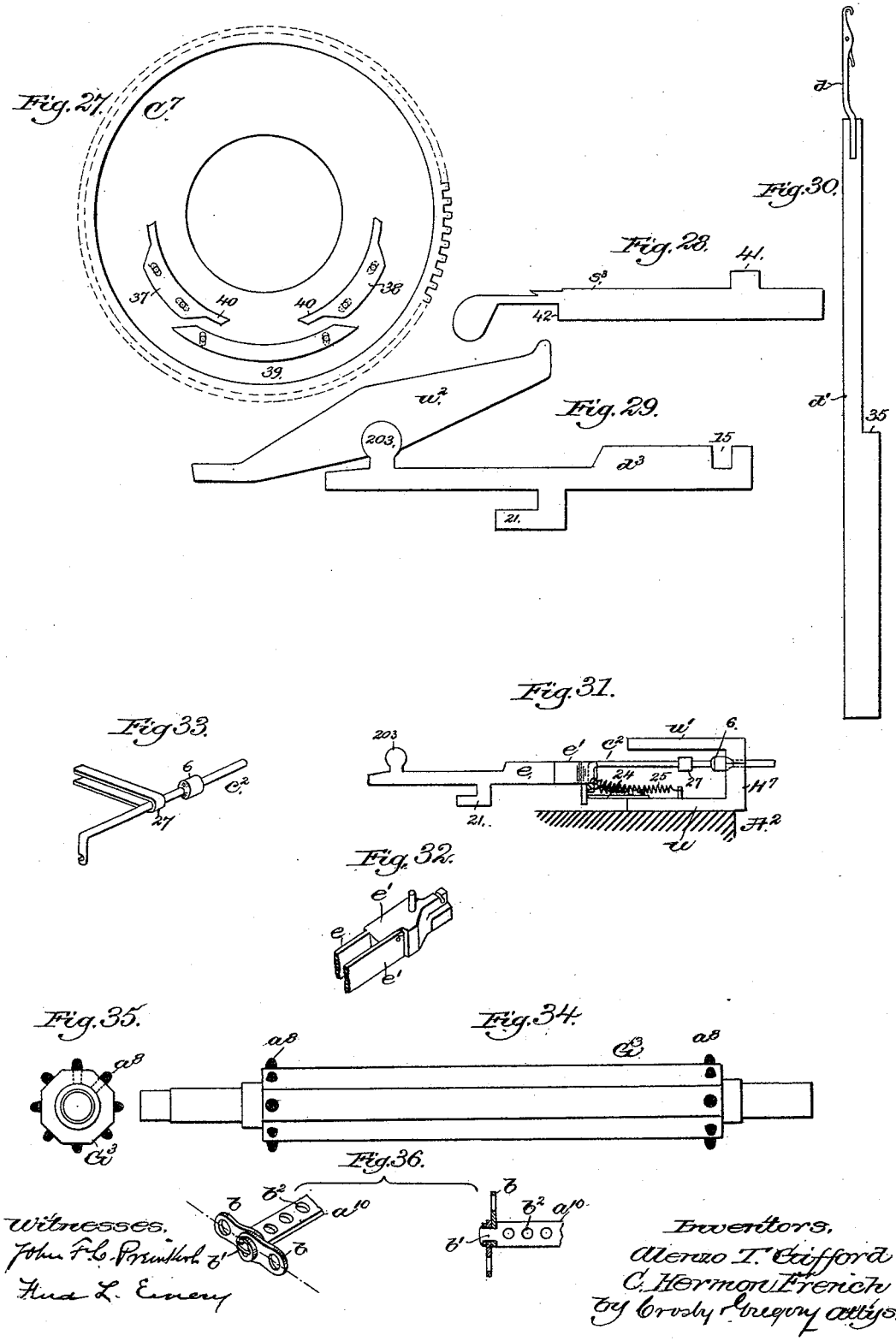

(No Model.) 14 Sheets—Sheet 12.
A. T. GIFFORD & C. H. FRENCH.
CIRCULAR KNITTING MACHINE.
No. 438,685. Patented Oct. 21, 1890.
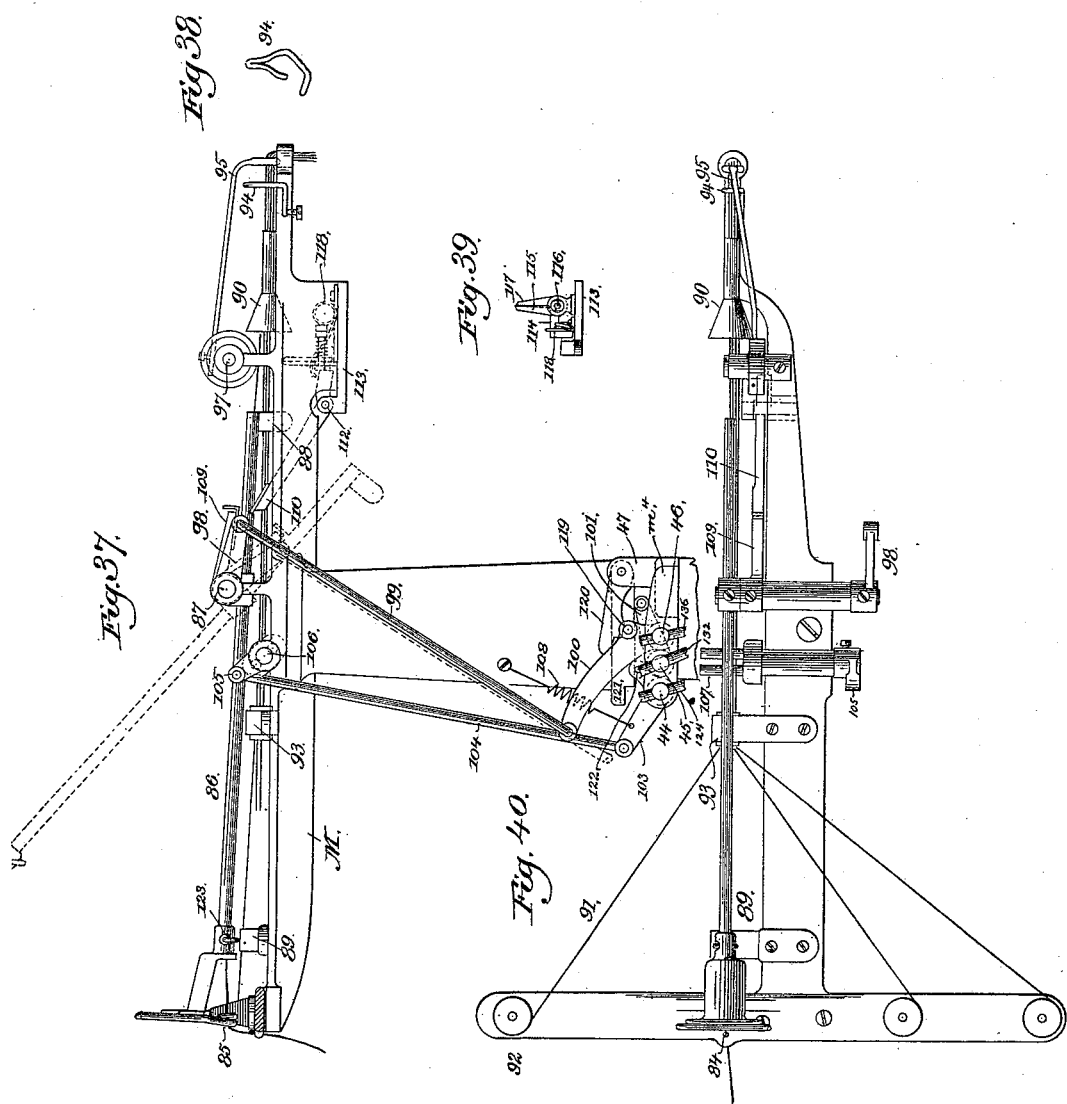

(No Model.) 14 Sheets—Sheet 13.
A. T. GIFFORD & C. H. FRENCH.
CIRCULAR KNITTING MACHINE.
No. 438,685. Patented Oct. 21, 1890.
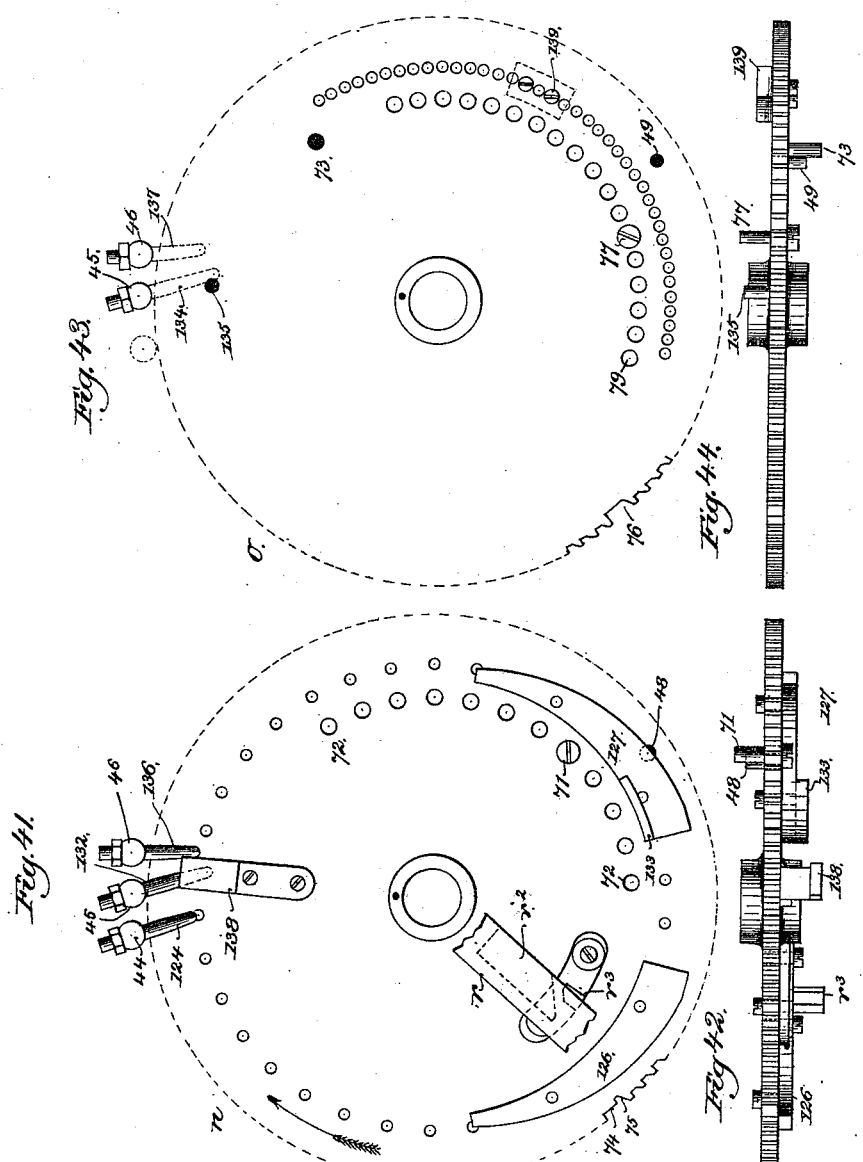

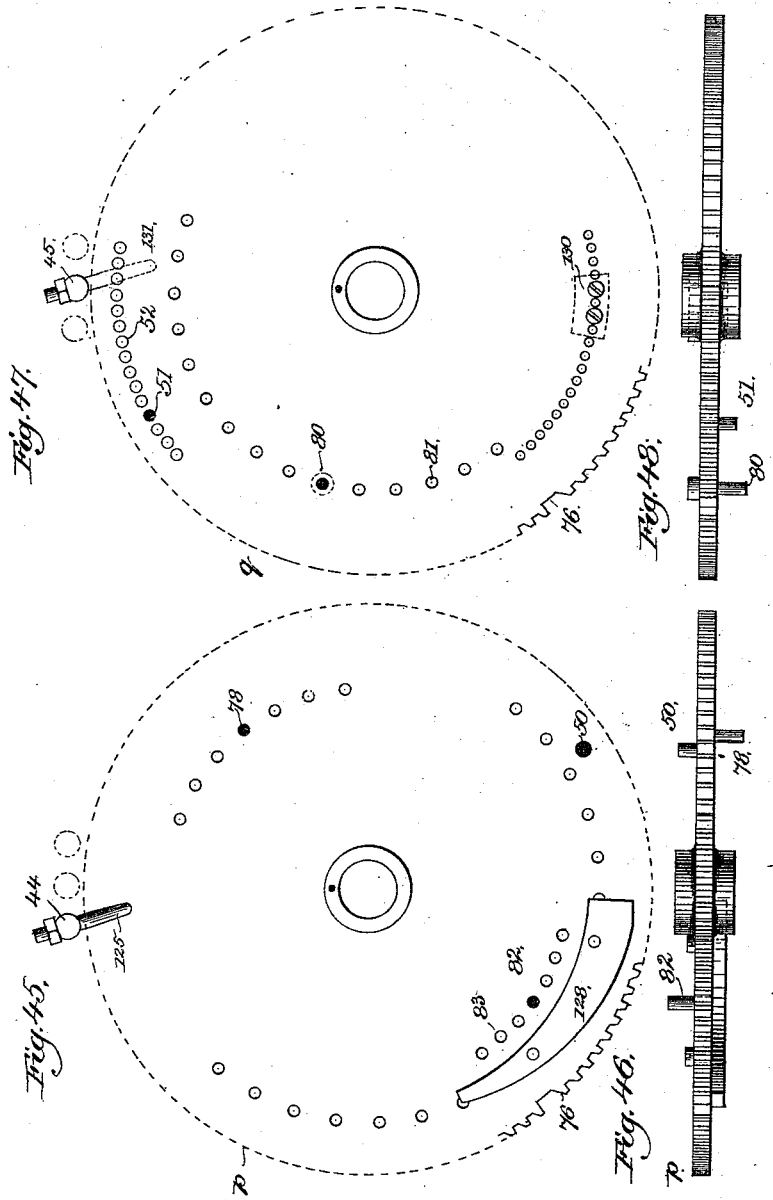

UNITED STATES PATENT OFFICE.

ALENZA T. GIFFORD AND CHRISTOPHER HERMON FRENCH, OF HOPEDALE, ASSIGNORS TO THE SHAW STOCKING COMPANY, OF LOWELL, MASSACHUSETTS.

CIRCULAR-KNITTING MACHINE.

SPECIFICATION forming part of Letters Patent No. 438,685, dated October 21, 1890.

Application filed March 20, 1886. Serial No. 195,926. (No model.)

*To all whom it may concern:*

Be it known that we, ALENZA T. GIFFORD and CHRISTOPHER HERMON FRENCH, both of Hopedale, county of Worcester, and State of Massachusetts, have invented an Improvement in Circular-Knitting Machines, of which the following description, in connection with the accompanying drawings, is a specification, like letters and figures on the drawings representing like parts.

This invention has for its object to improve that class of knitting-machines containing a series of vertically-reciprocating needles arranged in a grooved cylinder, and is intended especially as an improvement upon that class of machines wherein the cam-cylinder is at times rotated for the production of circular knitting, and is at other times reciprocated for the production of heels and toes for stockings, the machine being moved for different distances to provide for narrowing, and then for widening in corresponding manner to form a pouch serviceable in the production of both heels and toes for stockings.

The invention herein contained is intended as an improvement upon the machine described in United States Patent No. 228,480, dated June 8, 1880, to which reference may be had, the aim being to simplify the operation of the parts and cheapen their construction. In the patent referred to those needles which were employed to make stitches in the production of heels and toes, which needles were drawn out of position one or more at a time in narrowing, and again moved into position one or more at a time in widening, were controlled by levers acted upon by a so-called "Jacquard cam," the said levers being mounted upon carriages actuated by vertically-movable slides having their feet placed upon the cam-surfaces of a Jacquard pattern chain, the remaining needles, or those drawn out of position for the production of heels and toes, being actuated by a separate cam called a "working-cam," all the needles being drawn down at the proper time by a needle-depressing cam. In the said patent the so-called "working-cam" was adapted to and had to be moved radially inward with relation to the needles in the needle-cylinder for circular knitting and out for reciprocating knitting, and vice versa.

By the term, "circular knitting," herein described, we mean to imply that action of the machine wherein a circular web is being knitted, and the term "reciprocating knitting" we mean to imply that action of the machine when a fabric is being knitted suitable for heels and toes.

In accordance with our invention all the needles of the machine are actuated by levers mounted upon carriages, the needles all deriving their upward movement from a single cam, called the "lever-operating and needle-elevating cam," all the needles being depressed by a different needle-depressing cam, both the said cams being carried by one toothed wheel or ring surrounding the needle-cylinder. The carriages upon which the said levers are mounted are herein shown as of two different kinds. The "Jacquard carriages," as we shall term them, are those which are moved out of and into operation one or more at a time when reciprocating knitting is being done, or when the heels and toes of stockings are being knitted, and are jointed to fashioning-drivers, which are arranged parallel each to the other in guides, and the said fashioning-drivers are actuated in one direction by the straight bars of a Jacquard pattern-chain and in the other direction by springs. The "plate-carriages," as we shall call them, are those which carry the levers to actuate the needles that are to be simultaneously thrown out of action (about one half) when reciprocating knitting is to be done, and into action when circular knitting is to be done, are provided with notches to be entered by lips on a series of segmental plates, and are all moved out of and into operation by the segmental plates. There are two sets of Jacquard carriages, and between them we have placed a series of carriages in number equal to the number of needles desired to have in operation for the shortest course of knitting in a heel or in a toe, and these carriages, which have no longitudinal motion whatever, but always stand in such position as to enable the needle-moving levers moving thereon to be struck by the needle-lifting cam, we shall call the "stationary carriages," and although the plate-carriages and the stationary carriages are herein shown as constructed just alike we shall designate them by different letters. In our invention we have done away with the radially-moving working-cam described in the said patent. In the patent referred to, the needles which were operated to knit only when doing circular knitting were operated by a so-called "working-cam," and the Jacquard needles by a so-called "Jacquard cam," the so-called "working-cam" being moved radially out of working position when reciprocating knitting was to be done, there being above the working-cam a drawing-down cam. In case the said working-cam for any reason was not withdrawn at the proper time the needle slides and cylinders were frequently broken and damaged. In this our invention all the needles are operated by levers mounted on carriages, and all the levers are acted upon by the same cam to elevate the needles, and the said cam has no change of position except that due to its travel when knitting. Herein the carriages extend entirely about the needle-cylinder, and some of them are fixed in a given circle, and all the others are made movable radially toward and from the center of the machine, some of the carriages being moved radially in blocks or sections by segmental plates, while others are moved singly by the fashioning-drivers actuated by the bars of the pattern-chain.

Figure 9:
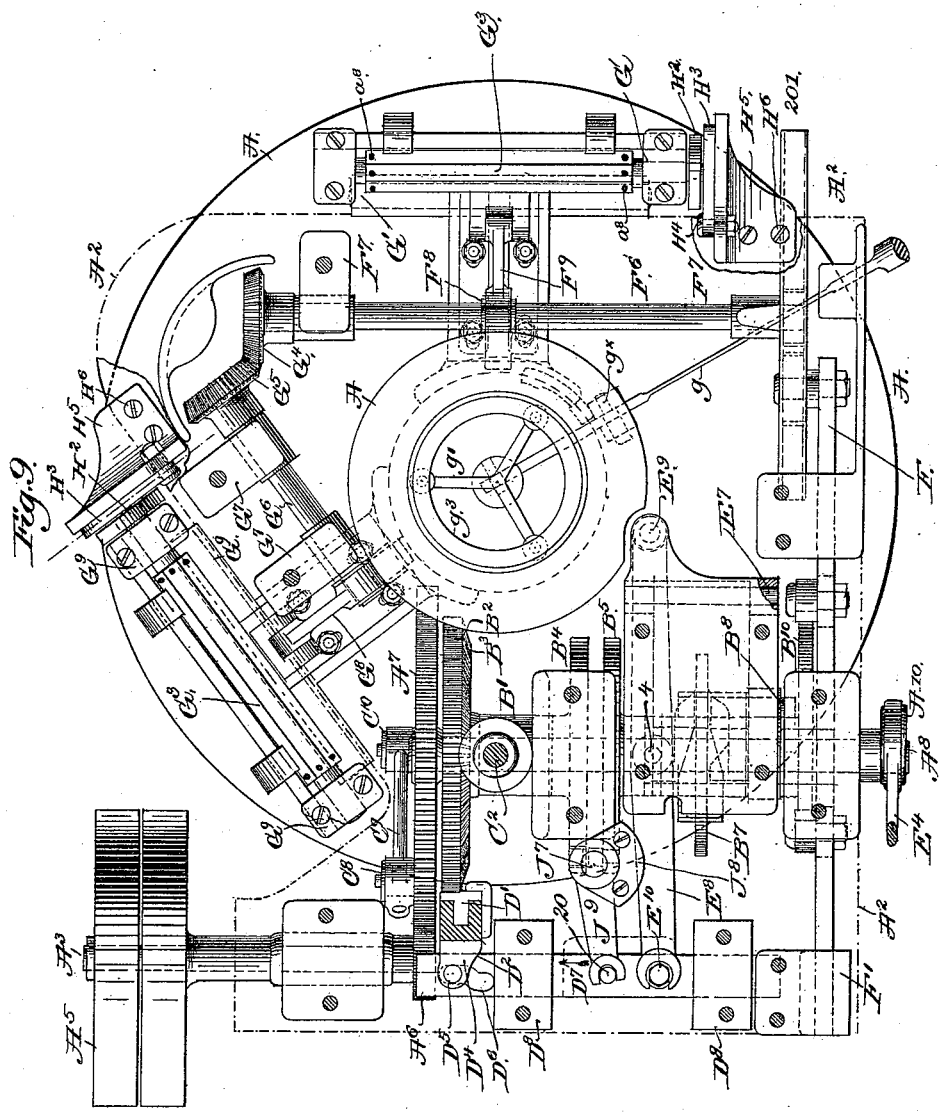
Figure 25:
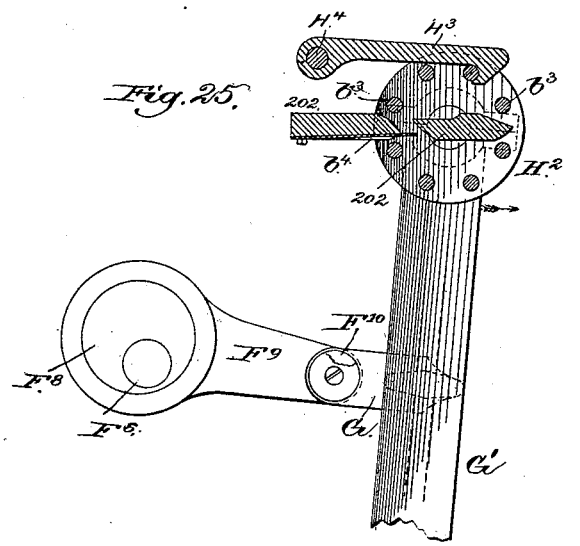
Figure 26:
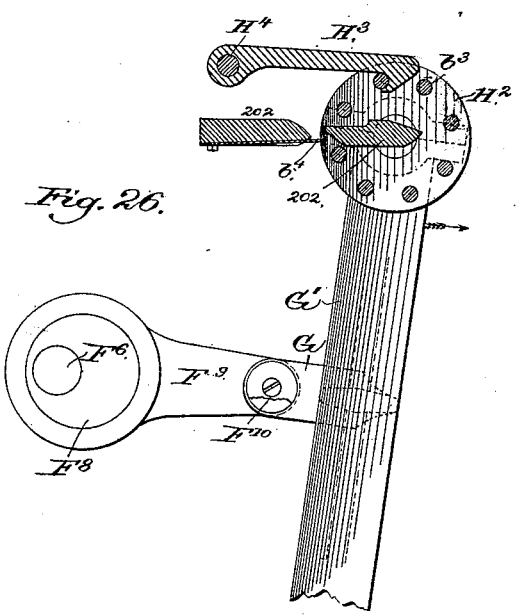

Figure 1 is a plan view of a knitting-machine embodying our invention, the foot-plate supporting the mechanism for controlling the yarn to be used in the production of a stocking being omitted, part of the frame-work being broken away to show devices covered by it. Fig. 2 is a front elevation of the chief part of the machine embodying our invention from the table upward, the foot-plate carrying the yarn-controlling devices being, however, omitted, the said devices so broken off being shown in front elevation in Fig. 37. Fig. 3 is a detail in plan view of the yoke and rock-shafts therein, to be described; Fig. 4, a perspective detail of the bearing for one of the rock-shafts to be described and the rock-shaft therein and some of its connected parts; Fig. 5, a detail of one of the locking-pawls shown in Fig. 2 and its spring; Fig. 6, a detail of the rocking plate instrumental in operating the cam-shifter; Fig. 7, a detail, showing the forward part or head of the yarn-carrier detached from the cam-plate. Fig. 8 is a front elevation of our improved machine from the table downward, a few of the parts above the table being left projecting above the table, but broken out, the ring for lifting all the needles when the ribbed top is being supplied to them being above the table, this Fig. 8, together with Figs. 2 and 37, to be described, forming a front elevation of our improved machine, the Jacquard pattern-chains being shown by dotted lines. Fig. 9 is an open or skeleton view showing the chief parts of the machine located below the table, which latter (shown by dotted lines) is supposed to be transparent, all the parts shown in the said figure, with the exception of the stands for holding the latches to rotate the shafts of the pattern-chain cylinders and the bracket for holding the rock-shaft for operating the slotted partial ring, being below the table. Fig. 10 is a partial left-hand end elevation of the machine, chiefly to show the main shaft, the devices thereon, the rack, its track, the pattern-wheels, and means to operate them, and the rock-shafts operated by the pattern-wheels, the said figure showing one of the frames for the pattern-cylinder and over which is passed one of the Jacquard pattern-chains, the latter being omitted. Fig. 11 is a section of Fig. 1 in the dotted line $xx$, chiefly to show the knitting devices, the parts shown being those located between the top of the flanged ring for holding the cam-plate and the table, the Jacquard pattern-chains and their devices, the pattern-wheels, and the gearing for actuating the cam carrying wheel or ring, and the cam-plate being omitted, the needle-lever at the right of the machine (it being mounted upon a stationary carriage) being in position to be actuated by the needle-elevating cam, but the lever at the left of the machine (it being mounted on a plate-carriage) is out of range of the movement of the said cam. Fig. 12 is a partial top view of the cam carrying wheel or ring with the parts attached to it. Fig. 13 is a detail showing an inner side view of the needle-depressing cams and the bolts to which they are attached, the said cams being removed from the interior of Fig. 12. Figs. 14 and 15 show the cam-hubs for moving the needle-depressing cams as developed or laid out as plane surfaces. Fig. 16 is a detail showing part of the cam carrying wheel or ring, its spring or locking device to hold in place the handles of the cam-hubs for operating the needle-depressing cams. Fig. 17 is an enlarged diagram, taken below the irregular dotted line $x^3$, Fig. 11, chiefly to show the bed in which slide the carriages upon which are mounted the needle-actuating levers, the needle-cylinder, the segmental plates, and some of the means for operating them when it is desired to draw out of operation those needles which are not to be used in the making of heels and toes, the Jacquard carriages containing the levers, which are to operate the needles which are to be used in knitting heels and toes being shown as attached to the carriage or fashioning-drivers, the upper parts of the guides for the drivers being omitted, the table being mostly omitted, the arm of the rock-shaft which is moved by the slide, to be described, being also broken off to save space on the drawings, as are also the said slide and two of the guides for the shanks of the segmental plates. Fig. 18 is an enlarged sectional detail taken across the guide-plate $h^7$ in the dotted line $y$, Fig. 17, together with a side elevation of a Jacquard carriage and part of a needle-lever thereon, a fashioning-driver for the said lever, and a spring for operating the carriage in one direction. Fig. 19 is a partial left-hand end elevation with the parts in a different position from that shown in Fig. 10, the said figure showing the upright shaft and gears thereon for actuating the cam-plate and the toothed plate which carries the cams for operating the needles, the figure also showing the devices employed to operate the shifting-lever of the safety-cam to control the time of the engagement of the pawl for operating the cam that in its rotation raises and lowers the cam-shifter, so that the latter may be changed only at the proper position of the main shaft, and that at the only time when circular knitting can be changed to reciprocating knitting. Fig. 19$^a$ is a partial section of Fig. 19 below the dotted line $x^{10}$. Fig. 20 is a detail showing a part of the table with a part of the bed to guide the carriages, the segmental plates for moving out of and into working position some of the plate-carriages containing the needle-actuating levers at that side of the machine where the needles are thrown out of operation entirely and do not knit while heel and toe work is being done, the said figure also showing the block, which carries two of the intermediate carriages controlled by the Jacquard pattern-chains, part of the driver for holding the said block being broken off, the remaining part of the driver being shown fully in Fig. 17, which figure also shows the block in a different position. Fig. 21 is a partial section of Fig. 19 in the line $x^4$, looking to the left, chiefly to show the cam which raises and lowers the cam-shifter, and pawl for moving the said cam, and the safety cam or device for insuring the descent of the said pawl at the proper time when circular knitting is to be changed to reciprocating knitting. Fig. 22 is a section of Fig. 21 in the dotted line $x^5$. Fig. 23 is a partial section of Fig. 10 in the irregular dotted line $x^6$, looking toward the right. Fig. 23$^a$ is a detail of the shifting lever. Fig. 24 is a detail showing part of one of the Jacquard pattern-chains and the devices for operating it, the said figure showing a part of the table. Figs. 25 and 26 are partial sections of the machine in the line $x^7 x^7$, Fig. 1, the said figure showing parts of the frame or carrier for moving the Jacquard pattern-chain, the devices instrumental in rotating the shaft carrying the chain, which latter is not shown, and means for vibrating the said frame. Fig. 27 is an under side view of the cam-plate for moving the web-holders; Fig. 28, a side elevation of one of the web-holders. Fig. 29 is an enlarged side elevation of a plate-carriage and needle-lever thereon, the said carriage being not controlled by the Jacquard pattern-chain, but rather by one of the segmental plates. Fig. 30 is an enlarged side elevation of one of the needles used in our machine, together with the slide to which it is attached. Fig. 31 is a detail, partially in section, of the block, having attached to it, as herein shown, two intermediate carriages and the driver and springs co-operating with it, the said figure also showing the driver-guide and part of the table; Fig. 32, a detail under side view of the block $e'$, its connected intermediate carriages being broken off; Fig. 33, a detail view of the driver which co-operates with the block, to which are attached the two intermediate carriages; Fig. 34, an enlarged view of the cylinder carrying the pattern-chain; Fig. 35, an end view thereof; Fig. 36, details of the pattern-chain bars and links to show their manner of junction. Fig. 37 is a partial front elevation of the foot-plate and standard thereon carrying the devices for controlling the threads used in knitting on their way to the usual thread-guide, the mechanism shown in this figure being that broken off from Fig. 1, the dotted line in the said figure showing the thread-guide for the thickening thread for heel and toe work, as in its elevated position. Fig. 38 is a detail showing the guide through which the yarn is passed immediately before entering the take-up. Fig. 39 is a partial right-hand end view of Fig. 37, chiefly to show the scissors for cutting the thickening-thread. Fig. 40 is a top or plan view of Fig. 37. Fig. 41 is a side elevation of the pattern wheel or device which governs the length of the leg and the tension on the thread used in the leg to fashion the same, the said wheel also carrying a projection to automatically stop the machine on the completion of a stocking, a projection to then start in motion the devices to cut off the thickening-thread, and a projection to effect the release of the tension; Fig. 42, an edge view of the wheel shown in Fig. 41; Fig. 43, a side elevation of the pattern wheel or device employed to determine the number of reciprocations of the machine in the manufacture of a heel, the said wheel having a projection to determine the time of the introduction of the thickening-thread, and also a projection to determine the time of cutting off the said thread on the completion of the heel; Fig. 44, an edge view of the wheel shown in Fig. 43; Fig. 45, a side elevation of the pattern wheel or device instrumental to determine the length of the foot, it having a cam to regulate the application of tension to the thread used in the foot; Fig. 46, an edge view of the wheel shown in Fig. 45; Fig. 47, a side elevation of the pattern wheel or device used to regulate the number of reciprocations of the machine in making the toe, the said wheel having a projection to determine the time at which the thickening-thread shall be introduced into the foot preparatory to knitting the toe, the said projection also determining the time at which the tension shall be removed from the thread or yarn used in the foot; Fig. 48, an edge view of the wheel shown in Fig. 47, all the wheels in Figs. 41 to 48 having pins which at the proper times determine the change from circular to reciprocating knitting, and vice versa.

The frame-work consists, essentially, of a column A, having an enlarged foot A', which is bolted to the floor, the said column at top having a table $A^2$, to the top and under side of which are secured suitable stands or brackets to support the different parts to be described.

The driving-shaft $A^3$ is provided with a fast and a loose pulley $A^4$ and $A^5$. In practice the said pulleys will be constructed substantially as described in United States Patent No. 360,383, dated March 29, 1887, or so as to constitute part of a fast and slow speed mechanism to insure for the said driving-shaft two speeds, one faster than the other, the fast speed being operative when circular knitting is being done or when the toothed gear or plate carrying the needle-actuating cams is being rotated to make the tubular part of a stocking, the slow speed being operative when reciprocating knitting is being done or when the said gear or plate is being reciprocated to produce the heel or toe of a stocking.

The driving-shaft $A^3$ at its inner end has fast on it a pinion $A^6$, it engaging a toothed gear $A^7$, fast on and rotating the main shaft $A^8$, the latter having fast upon it a collar $A^9$ and an eccentric $A^{10}$. The shaft $A^8$ has one of its bearings in a sleeve B, extended through a hub B' of a bracket secured to the under side of the table, (see Fig. 19,) where the said hub is represented as partially broken out to show the said sleeve. The sleeve B has fast upon it at one end the spur-gear $B^2$, having at one side bevel-teeth $B^3$, while at its opposite end the said sleeve has fast to it one-half $B^4$ of a clutch $B^4$ $B^5$, the other half $B^5$ being connected to a sleeve $B^6$, which has attached to it the shifting-cam $B^7$, the hub of the latter being provided with a pin $B^8$, which is adapted to enter loosely a hole in the collar $A^9$, fast on the main shaft, the said pin being long enough to extend through the said collar when the clutch $B^4$ $B^5$ is disengaged and to meet a lug or projection $B^9$ (see dotted lines, Fig. 23) on the cam $B^{10}$, which imparts motion to the devices for moving the Jacquard chains toward and from the fashioning-drivers, to be described, which move the Jacquard carriages $d^2$, (see Fig. 18,) having mounted upon them the needle-actuating levers $u^2$, the said cam running loosely with relation to the said shaft, the said pin $B^8$, when in engagement with the said projection, rotating the cam $B^{10}$ in unison with the shifting-cam $B^7$ and main shaft $A^8$. The face of the clutch part $B^5$, next the clutch part $B^4$, has a projecting pin C, that when circular knitting is being done enters a hole in the clutch part $B^4$ and drives it and the spur-gear $B^2$, the latter, by its bevel-teeth $B^3$, engaging the bevel-pinion C' on the upright shaft $C^2$, provided with the toothed gear $C^3$ to engage and rotate the wheel or plate $C^4$, which carries, among other things, the needle-elevating cam $C^5$ and the drawing-down cam made in two pieces $a$ $a'$, to be described. The shaft $C^2$ has also fast on it the toothed gear $C^6$, (see Fig. 1,) which engages the toothed periphery of the cam-plate $C^7$, which operates the web-holders $s^3$, the latter being substantially the same in construction and operation as the web-holders shown and fully described in the patent referred to.

The toothed wheel $A^7$ at its outer side is furnished with a crank-pin $C^8$, which has applied to it the link $C^9$, having its lower end applied to the pin $C^{10}$ on the arm D, attached to the reciprocating T-shaped rack-bar D', fitted to slide in or on a track $D^2$, pivoted at its lower end on a stud $D^3$, the said track being arranged vertically, a part of the arm D embracing the said track, the latter at its upper end being provided with an ear $D^4$, (see Fig. 9,) having a pin $D^5$, that enters a cam-slot $D^6$ in the rack-moving slide-bar $D^7$, fitted to slide horizontally in the guides $D^8$, attached to the under side of the table $A^2$.

When the clutch parts $B^4$ $B^5$ are in gear, as in Fig. 19, the slide-bar $D^7$ is in such position as to cause the track $D^2$ to be held back far enough from the spur-gear $B^2$ to effect the disengagement of the rack-bar D' from the said gear, and thereafter the shaft $C^2$ will be driven, as described, continuously rotating the parts for circular knitting, the rack-bar reciprocating, but not doing any work, the machine at such time being supposed to be running at its fastest speed, the cam $B^{10}$ being disengaged from the pin $B^8$ and at rest, the Jacquard chain, to be described, being also at rest.

To change to reciprocating knitting, as when the heel or toe is to be knitted, or to narrow and then widen a part of the stocking, the shifting-bar-controlling cam $D^9$, on a fixed stud $D^{10}$, is moved from its position, Fig. 23, by the pawl E, pivoted to the arm E' of the rocker-shaft $E^2$, mounted in a bearing $E^{40}$, (shown detached in Fig. 4,) the said rock-shaft having an attached arm $E^3$, which is jointed to a link $E^4$, actuated by the eccentric $A^{10}$, fast on the shaft $A^8$. The partial rotation of the said cam $D^9$, it having resting against it the pins $a^2$ $a^3$, extended from the vertical bar $E^5$, causes the descent of the said bar, compelling the free end of the cam-shifter $E^6$, pivoted at $E^7$ and forked at its outer end, (see Fig. 23$^a$,) to descend and place the finger $a^4$ thereof in line with the projection $a^5$ of the cam $B^7$, so that the latter, supposing the parts to be as in Fig. 19 and rotating in the direction of the arrow 200 near the shifting-cam $B^7$, will strike the said finger, and the latter, acting as a stop, will cause the said cam to be moved to the right, viewing said Fig. 19, far enough to disengage the clutch parts $B^5$ $B^4$, cause the pin $B^8$, carried by the said cam $B^7$, to engage the lug $B^9$, and start in motion the cam $B^{10}$ to operate the Jacquard pattern-chains H H'. When the cam $B^7$ is to be moved to engage the clutch parts $B^4$ $B^5$, the cam $D^9$ will be moved to lift the cam-shifter $E^6$, so that the finger $a^6$ thereof will be placed in the range of movement of and so as to be struck by the cam projection $a^7$ of the shifting-cam $B^7$, which will cause the said cam to be moved to the left, viewing Fig. 10.

The sleeve of the cam $B^7$ is provided with an annular groove 2, which is entered by a fork 3, provided with a pin 4, which has applied to it loosely a lever $E^8$, having its fulcrum at $E^9$ at the under side of the table $A^2$, the outer slotted or forked end of the said lever engaging a stud $E^{10}$ on and moving the slide-bar $D^7$ in unison with and in the same direction as the said cam $B^7$, the movement of the slide-bar $D^7$ when the cam $B^7$ is moved to effect the engagement of the clutch parts $B^4$ $B^5$ being such as to pull the track $D^2$ backward and remove the rack-bar $D'$ from its engagement with the toothed wheel $B^2$, this disengagement of the rack-bar from the said toothed wheel being effected after the partial engagement of the clutch parts $B^4$ $B^5$, so as to avoid any shock or lost motion when changing from circular to reciprocating knitting, or vice versa, as provided for and fully explained in the said patent.

In the patent referred to the toothed gear for reciprocating the rack is on one shaft, and the rack is moved horizontally. The spur-gear, which is engaged by the said rack to effect reciprocating knitting, is on another shaft, and the so-called sleeve and grooved disk for moving the shifting-lever is on a third shaft; but herein we have arranged the toothed gear $A^7$, the spur-gear $B^2$, and the shifting-cam $B^7$ all on the same shaft, so as to turn about the same center of motion, thus greatly reducing the number of the parts, securing compactness, and simplifying the same. The cam $B^{10}$ acts against friction rolls or studs on a pinion carrying slide F, held in guideways $F'$ $F'$, and adapted to be reciprocated horizontally, the said slide having a stud on which is mounted a pinion $F^2$, the periphery of which, below its center of motion, engages a stationary rack $F^3$, which causes the said pinion to be rotated partially as the said slide F is reciprocated. The pinion $F^2$ above its center of motion engages and reciprocates the rack $F^4$ in its guide 201, which in turn engages and rotates the pinion $F^5$, fast on the shaft $F^6$, having its bearings at $F^7$ at the under side of the table $A^2$, the said shaft having upon it an eccentric $F^8$, embraced by a part of a link $F^9$, jointed by pin $F^{10}$ (see Figs. 24 to 26) to an ear G, extended from the movable frame $G'$, pivoted at $G^2$, and provided at its upper end with suitable bearings for the reception of the pattern-chain cylinder $G^3$, having an enlarged body, and provided near its ends with pins $a^8$, (shown in solid black,) to enter the endmost holes $a^9$ of the Jacquard pattern-chain or surface H, composed, as herein shown, of bars $a^{10}$, connected by links $b$, the ends of the bars being reduced, as at $b'$, and extended through and so as to serve as the connecting pivots for the said links, as shown in Fig. 36. The bars $a^{10}$ have a series of holes $b^2$, more or less in number, and distributed over the said bars according to the particular drivers $c$ $c^2$, to be described, that each bar is to strike and move. The shaft $F^6$ has at one end a bevel-gear $G^4$, which engages a bevel-gear $G^5$ on and rotates the shaft $G^6$, having bearings $G^7$ attached to the under side of the table $A^2$, the said shaft having on it an eccentric like that marked $F^8$ on the shaft $F^6$, the said eccentric, through a link $G^8$, moving the frame $G^9$, pivoted at $G^{10}$, (see Fig. 10,) it having at its upper end a second pattern-chain cylinder or shaft $G^3$, on which is placed a second pattern chain or surface $H'$, constructed as described of the pattern-chain H.

Fig. 8 shows the two pattern-chains by dotted lines. Each cylinder $G^3$, carrying one of the Jacquard pattern-chains, has fast at one end a pin-wheel $H^2$, the pins $b^3$ of which are engaged by a pawl $H^3$, pivoted at $H^4$ on a bracket $H^5$, attached to the upper side of the table $A^2$ by screws $H^6$. The bracket $H^5$ at its rear side has a slotted shelf 202, (see Fig. 25,) provided with a spring $b^4$ to partially bridge the said slot. As the frame carrying the cylinder or shaft $G^3$ is moved outward or away from the center of the machine by the eccentric and link described, the pawl $H^3$ in engagement with one of the said pins, as in Fig. 25, causes the rotation of the wheel $H^2$, one of the pins $b^3$ (see Fig. 26) passing through the slot in the said shelf as the wheel is rotated from the position in Fig. 25 to that in Fig. 26, the said pin carried below the shelf passing at the next backward movement of the frame under the spring $b^4$, thus absolutely preventing any turning back of the pattern-chain. The said slotted shelf forms what we shall call a "locking device" for the pattern-chain shaft.

In the patent referred to the Jacquard pattern-chains were made of cast-metal bars having elevated cam-surfaces, which by a cam-like action on the feet of the slides lifted them vertically to move horizontally the carriages carrying the levers to actuate the needles employed to knit when making heels and toes or narrowing and then widening the stocking, and the said chains were very heavy, requiring a power-accumulating device to start them quickly. Herein each pattern-chain is very light and requires but the minimum of power to rotate it.

The table $A^2$ opposite each Jacquard pattern-chain has attached to it a guide $H^7$. (Shown fully in Fig. 1, partially in Fig. 17, and in section, Fig. 18.) The guide $H^7$ consists, essentially, of an L-shaped bar $u$, provided with notches for the reception and guidance of the drivers $c$ $c^2$. The drivers $c$ are held in the notches of the bar $u$ by the L-shaped cap $u'$, (see Fig. 18,) it forming the top of the said guide $H^7$, each driver having a collar 6 to form a stop and arrest the outward movement of the driver, the latter being normally drawn outward by a spring 7, attached to the downturned inner end of the driver and to a pin 8 on the lower bar $u$ of the guide $H^7$, the latter being screwed or otherwise firmly attached to the said table $A^2$.

The drivers $c$ of each set of drivers are all alike, except as to length, and each driver but the one marked $c^2$, to be hereinafter described, is at its front end passed through a socket at the rear end of a carriage $d^2$, which in narrowing and widening is to be reciprocated by the Jacquard pattern-chain referred to.

The needles $d$ (ordinary latch-needles) are connected to needle bits or slides $d'$, (see Fig. 30,) which are placed in vertical grooves in the outer side of the stationary needle-cylinder $H^8$, firmly bolted to the table $A^2$ by bolts $H^9$, extended upward (see Fig. 11) through holes in the said table and needle-cylinder and into the cylinder-cap $H^{10}$, which latter is grooved radially for the reception of the inner ends of the usual web-holders $s^3$, (shown separately in Fig. 28 and partially in Fig. 11.) The lower ends of the needle-slides $d'$ rest upon the ends of needle-levers $u^2$, substantially such as represented by like letters in the patent referred to; but herein the said levers are cut from thin sheet-steel, each lever having an orifice a little more than a semicircle, (see Figs. 11 and 29,) the said orifice receiving a correspondingly-shaped projection 203 left to form part of the carriage, the latter being also cut from sheet-steel.

In the patent referred to the levers for moving the needles are pivoted at one side of the carriage, such construction taking up so much space in thickness as to limit the number of needles that could be employed in a given space; but herein each needle-lever and its attached carriage occupy but one-half the space heretofore required for the carriage and lever described in the said patent.

The Jacquard carriages $d^2$ are placed in radial grooves in a carriage-guiding bed or plate I, attached to the top of the table $A^2$ by suitable screws, as at 10, Fig. 11, and are made to slide backward and forward in the said grooves. This bed or plate I has a raised central body 204, outside of which, into the path of movement of the cam $C^5$, extend the outer ends of the levers which are to be struck by the said cam.

In Fig. 17 the needle-slides are shown in section in the grooves of the needle-cylinder.

In Fig. 11 the stationary carriages $d^4$ at the right are shown in the position that they will occupy when the needles are to be reciprocated by the levers $u^2$ thereon, the outer ends of the said levers being in the path of movement of the needle-elevating cam $C^5$, attached by screw 12 to the bracket 13, secured by screw 14 to the hub of the wheel or plate $C^4$, which hub is embraced by the hub of the spider $I^3$, attached to the table. (See Figs. 1 and 11.)

At the left of Fig. 11 we have shown one of the plate-carriages or one of the series of carriages holding one of the levers which co-operates with one of the series of needles, which, when reciprocating knitting is being done, as is supposed to be the fact, as shown in said figure, are thrown out of operative position by moving the said carriages inwardly in their grooves in the bed I so far that the needle-elevating cam in its reciprocations cannot strike the outer ends of the needle-levers and lift the needles.

The plate-carriage shown at the left of Fig. 11, and also in Fig. 29, is one of a series of carriages in number equal to about one-half the number of needles used. Each plate-carriage has a notch 15, which is entered by a downwardly-extended lip (see Fig. 11) of a movable segmental plate J, there being three such plates shown in Fig. 17, the said plates, when moved radially inward toward the center of the needle-cylinder, pushing in all the carriages engaged by them, about one-half the plate-carriages being so pushed in far enough to place the outer ends of the levers $u^2$, mounted thereon, so far in toward the center of the machine as not to be acted upon by the cam $C^5$, and consequently all the needles above the said levers remain out of action while the needles instrumental in knitting the heel and toe are made to operate. Each segmental plate J has a backwardly-extended shank $J^2$, which slides in a guide-box $J^3$, and also a downwardly-projecting pin 16, which enters a cam-slot 17 (shown in dotted lines) in a slotted partial ring $J^4$, having a stud 18, over which is placed a link $J^5$, pivoted at its other end to an arm $J^6$ of a rock-shaft $J^7$, having its bearing $J^8$ attached to the top of the table $A^2$ by suitable screws 19, the arm $J^9$, also attached to the said rock-shaft, being forked to engage a pin 20 on the slide $D^7$, previously described, the movement of the said slide in one or the other direction effecting the movement of the slotted partial ring, which latter acts to simultaneously move out or in all the plate-carriages $d^3$, with which the said segments are engaged, the moving in of the said segments and plate-carriages placing the levers thereon out of the path of the cam $C^5$, causing the needles in line with them to be stopped, and vice versa. The movement of the slide-rod $D^7$ in the direction of the arrow upon it, Fig. 9, causes the movement of the slotted partial ring in the direction of the arrow 205 near it in Fig. 17, which movement would draw out all the said segmental plates and plate-carriages acted upon by them, leaving their levers in position to be struck by the cam $C^5$, as when circular knitting is to be done.

At the opposite side of the machine to that occupied by the segmental plates J is a stationary segment K, it having a downturned lip, (see the right of Fig. 11,) which enters the groove 15 of each of the series of stationary carriages $d^4$, located at that side of the machine, the said segment being stationary for the reason that a certain number of the needles between those controlled by the Jacquard pattern-chain and holding the stitches for the narrowest course on the heel or toe are always to be retained in working position, for such needles are used both when reciprocating and when circular knitting is being done.

Each carriage has at its under side a hook 21, which is extended under a lip forming part of the grooved carriage-bed I, to prevent the said carriages from being lifted accidentally.

Each Jacquard carriage $d^2$ is provided at its end with a loop, which is entered by the downturned end of the driver $c$, and is normally held out by a spring 7 in such position as to place the ends of the levers mounted on the said carriages in the path of movement of the said cam $C^5$.

To commence a heel or toe, all the plate-carriages controlled by the segmental plates J are moved so that the needle-moving levers thereon are left at rest, and the reciprocating motion of the parts having been commenced one or more Jaquard carriages at a time next the plate-carriages so thrown out of action are left at rest or are thrown out of action in the usual manner of narrowing, until the narrowest course for the heel or toe has been knitted, when widening is begun, and the Jacquard carriages and their levers are moved in such direction as to cause the needles to be thrown into action, one or more needles preparatory to each stroke. When the bar of a Jacquard chain is moved up to the guide $H^7$, all the Jacquard carriages connected to fashioning-drivers $c$, which are in line with and enter the holes $b^2$ in the said bars, are left in such position that the levers attached to them are operated by the cam $C^5$ to knit. There are two sets of fashioning-drivers $c$ operated each by bars of an independent pattern-chain, a bar in each chain being called into operation for each course.

To obviate what is called a "skip-stitch" at the commencement of each course of reciprocating knitting, it is essential to commence the return course on a needle nearer the center of the said course than at the end of the preceding course, this being necessary to insure such presentation of the yarn carried by the yarn-guide 22 as to enable the yarn to be caught by the hooks of the needles to be used in the next course to be made, and such being the case all the fashioning-drivers $c$ and the Jacquard carriages connected with them will never all be out in working position to any one course of reciprocating knitting, so that as circular knitting is commenced some of them operated from the Jacquard carriages will be in, and at such point the needles would not be operated to knit, but would cause a loose spot or skip-stitch. To obviate this difficulty, we have connected, as herein shown, two of the Jacquard carriages (marked $e\ e$) with a block $e'$, having a recess or notch at its rear end, (see enlarged detail, Fig. 32,) wherein the block is shown as inverted, which notch is engaged by the endmost driver $c^2$ next that end of the series of drivers $c$ (see Fig. 17) where the narrowing is commenced. To avoid confusion of terms, we shall call the said carriages $e\ e$ "intermediate carriages." The block $e'$ is normally pulled out by the spring 24, and the driver $c^2$ is normally pulled back and somewhat laterally, as in the said figure, by a spring 25. In Fig. 17 all the drivers $c$ are shown as left out, as they will be when the last course of reciprocating knitting is finished; but as such course is finished the block $e'$ and its attached intermediate carriages $e\ e$ and the driver $c^2$ will be held in by a bar $a^{10}$ of the chain in the position shown, the outer end of the said driver at such time resting against the said bar. The pattern-chain brought up to the drivers, as described, for the last course remains there while circular knitting is resumed; but circular knitting cannot be carried on properly without the block $e'$ and its attached carriages are released and drawn out, but as the driver $c^2$ is held pressed in by the bar of the chain and the movement of the chain has been for the time stopped some other provision must be made to release the said block. This we have done as follows, namely: We have provided the end of the slotted partial ring $J^4$ with a toe 26, which, as the said partial ring is moved in the direction of the arrow 205 near it, acts against one side of and pushes the driver $c^2$ aside far enough to remove its end from the recess at the end of the said block, thus permitting the spring 24 to assume control of and move the said block and its carriages outward, so that the levers carried by the said carriages are left in position to be acted upon by the cam $C^5$ in making the first circular course. The backward position of the block preparatory to circular knitting is represented in Fig. 20, in which position it remains until reciprocating knitting is again to be commenced.

Preparatory to commencing reciprocating knitting the toe 26 recedes from the driver $c^2$, and as the first course of reciprocating knitting is to be commenced the Jacquard pattern-chain is moved outward away from the drivers, which movement releases the driver $c^2$, permitting its spring 25 to pull it outward, so that the free end of the said driver is again sprung behind the block $e'$ and into the recess therein, and the said carriage will stand outward in the position that it would occupy were the outer end of the driver $c^2$ in line with the drivers $c$. The driver $c^2$ referred to, in order that its downward projection to act upon the block $e'$ may be kept in place, is provided with a clamp 27, (see Figs. 17 and 33,) which embraces several of the adjacent drivers $c$ and slides freely over them.

The toothed wheel $C^4$ (see Figs. 11 and 12) receives within its hub the drawing-down cam, made in two parts $a\ a'$, attached each to a sliding bolt 28, having at their outer convex sides, next the cam-hubs 29 30, pins 31, (shown in dotted lines, Fig. 12, and one in full lines, Fig. 11,) which enter slots in the said cam-hubs. These cam-hubs are provided with hand-levers 32, having toes 33 to engage a notch in a spring 34, attached to the wheel or plate $C^4$, the said spring preventing accidental movement of the said cam-hubs. While all ordinary knitting is being done the cam-hubs 29 30 are so placed as to keep the cams $a$ $a'$ down, and the latter being attached to the toothed wheel $C^4$ and moving with it act against the shoulders 35 of the needle-slides and depress the needles to draw new loops through the old loops on their shanks. The bolt 28, carrying the cam $a$, has attached to it above the said cam a curved finger 36.

Preparatory to commencing a stocking all the needles must be lifted to enable the ribbed top to be applied, and thereafter the needles are drawn down, as in regular circular knitting. To do this, first turn the cam-hubs 29 30 in the direction to raise the cams $a$ $a'$, and thereafter the hand-lever $g$, having its fulcrum at $g^\times$, (see Fig. 8,) is turned to lift the spider $g'$, which has attached to it wires or posts $g^2$, upon the top of which, at or just above the level of the table $A^2$, is supported the needle-lifting ring $g^3$, the upward movement of the said ring simultaneously raising the inner ends of all the needle-elevating levers, so that the latter lift all the needles.

Prior to this invention we are aware that it had been proposed to raise the needles simultaneously through the action of a rotating ring and a cam. In this condition of the needles the ribbed top is applied. While the ribbed top is being applied, the pin 31, co-operating with the cam-hub 30, stands in the larger end (see Fig. 15) of the groove in the said cam-hub 30.

Preparatory to commencing to knit the leg of the stocking upon the ribbed top, the yarn to be used will be placed so as to be presented to the hooks of the needles first to descend, and the cam $a$ is lowered by the cam-hub 29, so as to act upon the shoulders 35 of the slides $d'$ and draw down the needles, and when the needles have been so drawn down the other cam $a'$ may be drawn down, but it must be drawn down some time before reciprocating knitting is commenced. As the cam $a$ is drawn down, as stated, the finger 36, overlapping the cam $a'$, acts upon and starts the latter cam down for a short distance, such movement being possible by reason of the groove in the hub 30 being wider than the diameter of the pin 31, such partial depression of the cam $a'$ being necessary to obviate the possibility of the shoulders 35 striking against the upper inner end of the cam $a$ above its operative inclined edge. It will be noticed that the sliding drivers $c$ and $c^2$ are all straight rods arranged parallel to each other, and to enable the said drivers to reciprocate radially the carriages with which they are connected the said drivers are of different lengths and their inner ends when in normal position stand in the arc of a circle corresponding with the outer ends of the carriages, the outer ends of all the drivers measured from their shoulders 6 being of equal length, so as to project uniformly from the guide $H^7$ to meet the surface of the straight bar of the pattern-chain. A needle will be raised whenever the carriage holding its operating-lever is sufficiently far out in the groove in the carriage-bed to enable the end of the lever to be struck by the cam $C^5$.

In the patent referred to, the needles opposite those which were used in narrowing and widening had in practice to have their slides bent or sprung to thereby produce sufficient friction to prevent the said slides dropping by gravity as they passed the top of the working-cam; but herein each needle-slide is kept up by its own operating-lever until it is to be moved down positively by the drawing-down cam $a$ or $a'$, and at such time the working edge of the needle-elevating cam $C^5$ passes from the ends of the said levers, leaving the needle free to be moved down.

Fig. 27 shows the under side of the cam-plate for moving the web-holders. This plate has attached to it three cams 37, 38, and 39. Each of the cams 37 and 38, which drives the web-holders back from the center of the machine has prongs 40, which overlap the inner circular working edge of the cam 39, which moves the web-holders in the opposite direction, the said prongs serving as stops against which the nibs 41 of the web-holders strike, thus preventing any movement of the web-holders, due solely to momentum. Without said prongs 40 the web-holders are liable while the machine is in rapid motion to be moved too far in toward the center of the machine. These prongs prevent the shoulders 42 of the web-holders striking the thin walls of the cylinder-cap between the needles. The web-holder bed $h$, grooved radially for the reception of the web-holders, is sustained upon a circular plate $h'$, supported at opposite points upon shoulders of guide-rods $h^2$, placed in guides $h^4$, erected upon the table $A^2$, the said plate $h'$ being connected to the guide-rods by the nuts $h^5$, the plate $h'$ having adjusting-screws $h^3$, which abut against the upper ends of the guides $h^4$ and enable the leveling and adjusting of the said plate and bed. The plate $h'$ has a shoulder $h^6$, within which is held the lower end of the flanged ring or cover $h^7$, which is securely attached to the plate $h'$ by screws, as shown in Fig. 1. The web-holders are kept down in the grooves of the bed $h$ by the two rings $h^8$ $h^9$, which are attached to the said bed $h$. The cam-plate $C^7$ is held down by the flanged ring or cover $h^7$. The table $A^2$ has erected upon it a foot-plate $m$, provided with a hub $m'$ to receive the rigid stud $m^2$, which serves as the fulcrum for the pattern-wheels $n$ $o$ $p$ $q$. The foot-plate $m$ has bolted to it the upright $m^3$, which at its upper end carries the thread or yarn controlling mechanism, to be described. The upright $m^3$ supports the yoke $m^4$, having bearings 43 for the rocker-shafts 44, 45, and 46 and a bearing 47 for the pin 207 to serve as a fulcrum for the latches which hold the rocker-shafts in the position in which they are left by the cam or projection of the pattern-wheels until they are again to be released in the operation of the machine. The plate $m^4$ and its rocker-shafts, attached arms, and the latches are shown separately in Fig. 3. All the pattern-wheels are moved by a broad pawl $m^5$, pivoted at $m^6$ between two arms $m^7$ of a rock-shaft $E^2$, extended through a sleeve-bearing $E^{40}$, attached to the table $A^2$, the said rock-shaft being moved by the link $E^4$, before described. The bearing $E^{40}$ has a lug $m^9$, that receives a screw-stud $m^{10}$, which acts as a guide for the slide $r$, guided at its upper end by the screw-stud $r'$, and provided at its rear side with a cam projection $r^2$, against which strikes, at the completion of each stocking, the cam projection $r^3$ on the wheel $n$, and in practice this slide $r$ may be used as one device in connection with any usual or suitable stopping mechanism, so that when said slide is moved the machine may be stopped, the said devices not being herein shown, because they are not to be claimed. The foot-plate $m$ has a stud $r^4$, which is extended horizontally across the wheels $n$ $o$ $p$ $q$, the said stud carrying a hub $r^5$, having a broad flat plate $r^6$, (see detail Fig. 6,) provided with adjustable cam projections $r^7$ $r^8$, both alike. The hub $r^5$ has attached to it an arm $r^9$, acted upon by a spring $r^{10}$, attached to the foot-plate $m$, (partially shown in Fig. 6,) the said spring normally acting to keep the broad plate $r^6$ pressed upward toward the pattern-wheels, so that the cam projection $r^7$ on the said plate may be acted upon at the proper times by the pin 48 at the rear side of the wheel $n$ and the pin 49 at the front side of the wheel $o$, the said pins striking at different times opposite edges of the cam projection $r^7$. A pin 50 at the rear side of the wheel $p$ and a pin 51 at the front side of the wheel $q$, the latter pin being in one of the holes 52, strike at the desired times the cam projection $r^8$. Each pin referred to as it meets the cam projection $r^7$ or $r^8$ depresses the broad plate $r^6$ and moves back in unison with it the arm $r^9$, which at its free end has a pin 53, which is extended through a slot 54 (see Fig. 23) of the foot-plate $m$, the said pin 53 at the rear side of the said plate $m$, as the said arm $r^9$ is lowered, permitting the pawl E, pivoted to the arm E' of the rock-shaft $E^2$, before described, to fall sufficiently to engage one of the pins 56 of the cam $D^9$ and rotate the same to raise or lower the cam-shifter $E^6$, as before described, whenever a change is to be made from reciprocating to rotary knitting, or vice versa. The end of the pawl E is prolonged beyond its hook to rest above a safety-cam 57, loose on the shaft 58, which shaft is extended backward through a bearing 59, fast to the table $A^2$, the rear end of the said shaft having a worm-gear 61, which is engaged by a worm 62 on the upright shaft $C^2$, before described. The shaft 58 has fast on it a collar 63, having a hub 64, (see Fig. 22,) which enters a recess cut into the side of the cam 57. The hub 64 has connected to it one end of a clock-spring 65, the outer end of which spring is connected to the cam 57 at the inner side of its recess, the stress of the said spring normally acting to keep a pin 66 on the cam 57 in contact with a pin 67 on the collar 63. The shaft 58, when circular knitting is being done, rotates continuously, and the speed of rotation is such that it rotates once to each three rotations of the main shaft $A^8$, and while reciprocating knitting is being done the said shaft 58 has a rotary reciprocating motion for about one-third of a rotation.

In the machine herein described the wheel or ring $C^4$, which carries the cams for reciprocating the needles, has been made to rotate eight times, while the main shaft $A^8$ rotates three times, such being done to enable the parts to be compactly arranged and correctly timed, and the timing is such and the devices for controlling the pawl E are so constructed and operated that the pawl E may operate to move the cam $D^9$ to change from reciprocating to circular knitting at any rotation of the main shaft; but the change from circular to reciprocating knitting can be made only at some rotation of the main shaft which is divisible by three.

The cam-shifter $E^6$ is in practice raised or lowered considerably in advance of the time that it is to be struck by the cam $B^7$, which occurs whenever the knitting is to be changed from circular to reciprocating knitting, and vice versa.

Should the pins 53 from any cause be lowered out of time, the pawl E might be dropped to rotate the cam $D^9$ out of time, which would disarrange or break the machine. To obviate this the end of the pawl E is extended forward over the cam 57, as stated, to prevent the possibility of the engagement of the pawl E with the cam $D^9$ to effect a change from rotary to reciprocating knitting except at such time as when the needle-operating cams are all in proper position to permit circular knitting to be changed to reciprocating knitting, this change in the machine herein described being adapted to be made only when the cam $C^5$ is at about the center of the set of needles used to form the heel or toe, and at such times as when the toe $a^4$ is in position to be struck by the cam projection $a^5$, this being possible to happen in this present machine only at such a rotation of the shaft $A^8$ as is divisible by three.

When circular knitting is being done, the cam $D^9$ and pawl E are in the position Fig. 23, and to change to reciprocating knitting the pin 53 must be lowered to let the pawl E, which is reciprocated continuously, drop and engage one of the pins of the cam $D^9$.

During circular knitting the front end of the pawl E stands above the cam 57, and the pawl is not moved by the said cam. The cam 57 is, however, so shaped that in case the pin 53 should be lowered at the proper time, the front end of the pawl is free to descend, notwithstanding the said cam 57; but should the said pawl be permitted to drop at the wrong time, the cam 57 will arrest it, so that the projection of the said pawl will not engage a pin 56 of the cam $D^9$. This cam 57 is therefore so shaped that the pawl E cannot drop to engage a pin 56 except at a certain definite rotation of the main shaft, as stated—as, for instance, any third rotation thereof.

When the pawl E is permitted to drop to move the cam $D^9$ to prepare for the change from circular to reciprocating knitting, the cam 57 is rotating continuously, and the cam 57 has, it will be understood, to be in such position as to let the pawl E drop and move the cam $D^9$ to drop the cam-shifter, as stated, in advance and leave it at rest a little while before the toe $a^4$ is acted upon by the cam portion $a^5$ of the slowly-moving cam $B^7$, and during this time the cam 57 is held at rest.

Referring to Fig. 21, the cam $D^9$ acts against the pin 68 of the cam 57 and holds it back while the hub 63 is rotating in the direction of the arrow 69. In said figure the pawl E has just completed its forward stroke in the direction of the arrow 70, and the pawl E, having completed its forward stroke, now returns and leaves the cam $D^9$ standing at rest and holding the cam 57, and as the pawl is moved backward the pin 53 will be lifted to retain the pawl E elevated, as in Fig. 23.

Referring again to Fig. 21, the cam $D^9$ will hold the cam 57 in the position therein shown until the pawl E is again permitted to drop and engage a pin 56 on and rotate the cam $D^9$ to change from reciprocating to circular knitting, this change being capable of being made at any thrust of the pawl E, for the cam 57 is so held as not to interfere with the dropping of the said pawl. While the cam $D^9$ acts to hold the cam 57 in the position shown in Fig. 21, the shaft 58 continues to rotate, and its keeps up its rotation until the cam $B^7$ effects the change of the parts to produce reciprocating knitting, the spring 65 permitting this. As the cam $D^9$ is again acted upon by the pawl E and moved from the position Fig. 21, it releases the cam 57, permitting the spring 65 in the latter to immediately throw the cam 57 forward, so turning it on the shaft 58 as to permit the pin 66 to meet the pin 67 and again place the cam 57 in correct position on its shaft 58.

The foot-plate $m$ has fixed to it a stud $t$, on which is mounted a series of detents $t'$, one of which is shown in Fig. 5 detached and in place in Fig. 2 in full lines, the said detents being acted upon by springs $t^{20}$, attached to the stud and bearing on the said pawls. Each of these pawls has two teeth $t^{14}$.

The wheel $n$ has uniformly-placed ratchet-teeth at its periphery except at the point 74, (see Fig. 41,) where one of its teeth is broken out, and the next space to it (see 75) is cut deeper.

When a stocking is commenced, the pawl $m^5$ starts the wheel $n$ in rotation, none of the other wheels $o$, $p$, or $q$ moving, because the said pawl plays back and forth in a toothless space or broad notch 76; but as soon as the screw 71, extended through the wheel $n$ in one of its holes 72, meets the pin 73 on the wheel $o$, which it does when the leg of the stocking has been knitted for a length determined by the position of the screw 71 on the wheel $n$, the wheel $o$ is started and moved with the wheel $n$ until the pawl $m^5$ engages one of the teeth of the wheel $o$, and thereafter the said pawl moves both the wheels $n$ and $o$ in unison. As soon as the wheel $o$ is started the pin 49, before referred to, depresses the lever $r^6$ and prepares for the change from circular to reciprocating motion for the production of a heel. The wheel $o$ in its rotation brings the screw 77 in contact with a pin 78 on the wheel $p$, which is called the "foot-wheel." The pin 77 will be placed in one or the other of the series of holes 79, according to the length of the heel. As the screw 77 strikes the pin 78, the wheel $p$ is started sufficiently to enable the pawl $m^5$ to catch and thereafter move it with the wheel $o$. As soon as the wheel $p$ is started, its pin 50 strikes the cam projection $r^8$, before referred to, and operates the lever $r^6$ to effect the change described from reciprocating to circular motion to enable the foot of the stocking to be knitted, the length of the foot depending upon the position of the screw 80 in the holes 81 in the wheel $q$, which screw is struck by the pin 82 in one of the series of holes 83 of the wheel $p$. As soon as the pin 82 strikes the screw 80, the wheel $q$ is started up and moved far enough for the pawl $m^5$ to take control of it, and the said wheel $q$ in its rotation brings the pin 51 against the cam projection $r^8$, before described, and again effects the change from circular to reciprocating knitting, which is kept up until the toe has been finished, the length of the toe depending upon the distance of the pin 51 from the space 76 in the wheel $q$. In its rotation each wheel $n$, $o$, $p$, and $q$, it having been rotated once or so as to bring its toothless space next the pawl $m^5$, is stopped. The wheels $n$, $o$, and $p$ are all at rest before the pawl $m^5$ enters the space 76 of the wheel $q$, and as soon as the space 76 of the wheel $q$ comes into line with the like spaces of the adjacent wheels the pawl $m^5$ is permitted to sink into the notch 75 of the wheel $n$ next its space 74, and the pawl $m^5$ at its next thrust moves the wheel $n$, but does not move the wheels $o$, $p$, or $q$. The movement of the wheel $n$ causes the pin 48 thereon, previously described, to strike the cam projection $r^7$, and again effect the change from reciprocating to circular motion, and two or more circular courses are then knitted and the machine is stopped, as before described.

For the heel and toe a thickening-thread is introduced. This thickening-thread is taken from a suitable bobbin (not shown) through the guide 84, thence through an eye in a plate 85, and through a tube 86, mounted on a rock-shaft 87, and having attached to its forward end a separating-plate 88, the upward movement of the delivery end of the tube 86 being arrested by a stop 89, the object being to stop the delivery end just above the level of the path of movement of the regular knitting-threads, two or more of which are used, so that the free end of the thickening-thread depending from the delivery end of the said tube may hang between the said regular knitting-threads as the delivery end of the tube is stopped above them, the said regular threads picking up and carrying with them the said thickening-thread into the tube 90. The regular knitting-threads 91, taken from suitable bobbins, (not shown,) are led through guides 92 and thence through a guide-eye 93 into the tube 90, thence through the wire 94, and through the eye of the take-up 95, normally held up by a spring connecting the hub of the said take-up with the pin 97, which serves as the fulcrum for the take-up lever, such lever and spring (the latter not herein shown) being of common construction and not herein claimed. From the take-up the threads used in knitting enter the eye in the usual thread-guide 22. The rock-shaft 87, carrying the tube, has at one end an arm 98, which by link 99 is attached to one end of the arm 100, in turn attached to the rock-shaft 46, held in the yoke $m^4$. The rock-shaft 44, held in the said yoke, has an arm 103, which by a link 104 is attached to an arm 105 of a rock-shaft 106, mounted in a bearing on the horizontal arm M. The opposite end of the rock-shaft 106 has attached to it a fork 107, (see Fig. 40,) the said fork, as it is partially rotated, bending the threads past them out of straight line and producing tension thereon. The arm 103 is normally held up, as in Fig. 37, by the spring 108, the spring when it so acts keeping the fork in position not to produce tension on the thread. The rock-shaft 87 has attached to it near the tube 86 an arm 109, which, as the delivery end of the said tube is depressed strikes one arm of a lever 110, pivoted at 112 on the bracket 113, and the short end of the said lever, striking one arm 114 of a shear 115, pivoted at 116 and having co-operating with it a stationary shear-blade 117, erected on the bracket 113, separates the said blades for the introduction between them of the thickening-thread as the delivery end of the tube 86 is lowered, the spring 118, as the arm 109 passes the lever 110, acting to close the said blades and cut off the said thread. When the delivery end of the tube 86 is depressed by the movement of the arm 100, a pin 119 on the said arm is engaged by a latch 120, and the tube is held in dotted-line position, Fig. 37, until the latch 120 is moved to release the arm 100, which is done when the thickening-thread is again to be introduced. When the arm 103 is pulled down against its spring 108 to put tension on the threads, the latch 121 catches a pin 122 thereon and holds the said arm so long as it is desired to keep tension on the thread. Tension may be put on the yarn at the leg or foot.

The rock-shaft 46 has fast upon it an arm 101, provided with a pin, which is extended horizontally under the latches 120 121 and lifts them at the proper times to release the tension and to permit the outer or receiving end of the tube 86 to descend by the action of gravity and bring its delivery end in position to give up the free end of the thread depending from it to the passing threads 91. The tube 86 has connected to it loosely a small ring 123, through which the thickening-thread is passed, the said ring acting as a detent to prevent backward movement of the said thread. The rock-shaft 44 has on it two pins 124 and 125. The pin 124 is acted upon in succession by cams 126 and 127, attached to the wheel $n$, the cam 126 turning the rock-shaft to effect the putting of tension upon the threads used in the leg, and the cam 127 permitting the arm 103 to rise slowly after it has been released by the latch 121, it being desired to remove the tension gradually. The pin 125 is acted upon by a cam 128, carried by the wheel $p$, when it is desired to put tension on the threads used in the foot, the tension being released by the action of the cam 130, attached to the toe-wheel $q$, acting upon the pin 131, attached to the rocker-shaft 45, it having attached to it the arm 101, before described. The rock-shaft 45 last referred to has a pin 132, which is acted upon by the cam projection 133, attached to the cam 127, fast on the wheel $n$, the said cam 133 effecting the release of the latch 121 from the arm 122 when the tension on the yarn in the leg is to be released. The rock-shaft 45 has yet another pin 134, (see Fig. 43,) which is struck during the early part of the rotation of the heel-wheel $o$ by the pin 135 to turn the rock-shaft 45 and cause the arm 101 to lift the latch 120, so that the receiving end of the tube 86 is free to fall, as described.

The rock-shaft 46 has on it two fingers 136 and 137. The finger 136 (see Fig. 41) is acted upon by the cam projection 138 to turn the said rock-shaft, and at the time that it is necessary to turn the rock-shaft 87 to lower the delivery end of the tube 86 and cut off its thread, the distance between the end of the tube and the scissors and the movement of the tube and of the scissors as to the tube when the thickening-thread is cut off being so timed and proportioned as to leave about four inches of the thickening-thread depending from the delivery end of the said tube. The cam 138 acts when the thickening-thread is to be removed from the toe, and the cam 139 on the heel-wheel $o$ acts in like manner on the finger 137 when it is time to cut off the thickening-thread from the heel.

Fig. 7 shows the head of the yarn-guide 22 as detached from the machine. The head of the yarn-guide referred to has a slot, as shown in Figs. 7 and 11, through which is extended an adjustable screw 207, carried by the plate 208, the lower end of the said screw acting upon the top of the plate $C^7$ to permit the head of the yarn-guide to be adjusted vertically. The said head also has two threaded openings 801, (see Fig. 7,) in which are screwed two like screws 800, (shown in Fig. 1,) the said screws passing through slots in the plate 208. The front end of the yarn-guide above and about the delivery-eye 212 is cut away, (see Fig. 7,) leaving a projection 213, the upper edge of which is curved or shaped to correspond substantially with the path traversed by the hooks of the needles when rising to take the yarn and descending with it to knit, the projection supporting the yarn or yarns to be engaged by the hooks of the descending needles, the space above the said projection preventing the rubbing of the hooks of the needles against the yarn-guide, which with fine needles is a great desideratum, for otherwise the hooks are liable to be bent and worn unduly. The face of the projection 213 is concaved to conform to the exterior of the circle of needles.

I claim—

1. The needle-cylinder, needles therein, the radially-grooved annular carriage-bed, a series of Jacquard carriages therein, needle-actuating levers, one for each needle, mounted upon the said carriages, and the cam-carrying wheel or ring and cam to operate the said needle-levers, and through them elevate all the needles at the proper times, and the drawing-down cam, combined with a series of horizontally-arranged fashioning-drivers jointed to the said carriages, and with a Jacquard pattern-surface to strike against the ends of and operate the said fashioning-drivers, substantially as described.

2. The needle-cylinder, needles therein, the radially-grooved carriage-bed, a series of plate-carriages therein, provided with notches near their outer ends, needle-actuating levers mounted upon the said carriages, the cam-carrying wheel or ring and its attached lever-operating and needle-elevating cam, and the drawing-down cam, combined with radially-movable segmental plates to engage a number of the said carriages, and with means to operate the said segmental plates and the cam-carrying wheel or ring, substantially as described.

3. The radially-grooved carriage-bed, the Jacquard carriages therein, a guide for a series of drivers, a series of drivers arranged therein and provided each with a shoulder, combined with a series of springs to normally move the carriages outward, and with a Jacquard pattern-chain to act upon the outer ends of the said drivers, the drivers being of unequal lengths and having their inner ends jointed to the carriages, substantially as described.

4. The grooved needle-cylinder, a series of needles arranged therein, a grooved bed, a series of Jacquard carriages arranged therein, a series of levers mounted upon the said carriages, a series of drivers jointed to the ends of the said carriages, a guide for the said drivers, springs to operate them in one direction, a Jacquard pattern-chain, means to move it to operate the drivers and carriages in opposite directions, the series of plate-carriages having a series of levers mounted thereon, and two or more radially-movable segmental plates and means to operate them, combined with a cam-carrying wheel or ring, the needle elevating and depressing cams, and means to move the said wheel or ring, whereby the levers mounted on the said plate-carriages may be placed out of or in the range of movement of the said cams, substantially as described.

5. The needle-cylinder, radially-grooved annular carriage-bed provided with a shoulder 204 and extended entirely around the needle-cylinder, the needle-carriages $d^2$ $d^3$ $d^4$, placed therein, and levers mounted upon the said carriages, combined with a cam-carrying wheel or ring and cam thereon to act against the outer ends of the said levers when the carriages are drawn outward far enough beyond the said shoulder to be operated by the cam, and means to move the said cam-carrying wheel or ring, substantially as described.

6. The radially-grooved bed provided at its lower side with an annular groove leaving a lip, combined with a series of carriages having projections 21 to enter the said groove and engage the said lip to prevent the accidental lifting of the said carriages from the grooves of the bed, substantially as described.

7. The grooved needle-cylinder, a series of needles therein, a cam-carrying wheel or ring and the drawing-down cams $a$ $a'$ connected therewith, means to move the said wheel or ring, and means to lift the needles, combined with cam-hubs and means, substantially as described, between them and the said drawing-down cams to enable the latter to be raised or lowered by hand, substantially as described.

8. The needle-cylinder, a series of needles arranged therein, a series of levers to actuate the said needles, and means to support the said levers, a cam-carrying wheel or ring, the drawing-down cam, and means to lift the cam vertically with relation to the said wheel or ring, combined with the needle-lifting ring $g^3$ and with means to operate the said needle-lifting ring to thereby lift all the needles quickly for the application to their hooks of the loops of the ribbed top, substantially as described.

9. The radially-grooved bed, a series of Jacquard carriages therein, a series of needle-operating levers mounted thereon, a cam to move them, a series of drivers jointed to the said carriages, a Jacquard pattern-chain, means to guide and to actuate the said drivers according to the demands of the Jacquard pattern-chain, a second series of plate-carriages mounted in radial grooves in the said bed and provided with a series of needle-actuating levers, one or more radially-movable segmental plates to engage the said plate-carriages, and means to operate the said plates, combined with the block $e'$ and one or more carriages $e$ attached thereto, the needle-actuating levers mounted on the said carriages, the driver $c^2$, the springs 24 and 25, and the finger 26, to strike the said driver and disengage it from the said block, substantially as described.

10. The drivers $c$ and the guide to hold them, combined with the driver $c^2$, having the guiding-clamp 27 attached thereto and embracing the drivers $c$, to operate substantially as described.

11. The main shaft, the toothed wheel $A^7$, and the collar $A^9$ fast on the said shaft, the s ting-cam $B^7$ loose on the said shaft and provided with a clutch part $B^5$, a sleeve surrounding the said shaft and provided with a spur-gear $B^2$, and the clutch part $B^4$, combined with the shaft $A^3$, its pinion, the track or guide $D^2$, the rack $D'$ thereon, the link connecting the toothed wheel with the said rack, means, as described, to shift the shifting-cam, and of means, as described, to put the rack $D'$ into and out of engagement with the spur-gear, to operate substantially as described.

12. The main shaft, the shifting-cam thereon, and the cam-shifter having toes $a^4$ $a^6$, combined with the bar $E^5$, provided with pins or projections and with a cam to operate the said bar, and means to rotate the said cam intermittingly, substantially as described.

13. The main shaft, the sleeve $B^6$, the shifting-cam thereon, means to rotate the said sleeve, the yoke 3, the lever $E^8$, and the slide-bar $D^7$, and rock-shaft having the arms $J^9$ $J^6$, and link $J^5$, combined with the slotted partial ring $J^4$ and the segmental radially-moving slides J, having shanks $J^2$, and with guides for the said shanks, substantially as described.

14. The rotating shifting-cam $B^7$, means to rotate it, its projecting pin, the cam $B^{16}$, provided with the projection $B^9$ to be engaged by the said pin, the slide F, pinion $F^2$, rack $F^3$, sliding rack $F^4$, shaft $F^6$, its gear $F^5$, and eccentric $F^8$, link $F^9$, combined with the carrier $G'$, the Jacquard pattern-chain shaft or cylinder, and Jacquard pattern-chain thereon to operate substantially as described.

15. The horizontally-reciprocating carrier or frame $G'$, the shaft or cylinder $G^3$, mounted therein and having a disk provided with pins $b^3$, and means to move the said frame, combined with the table, the bracket thereon having the slotted shelf, and with the pawl to engage the said pins and rotate the cylinder intermittingly, the pins passing through the slot in the shelf, the shelf thereafter acting as a locking device to prevent backward movement of the cylinder, substantially as described.

16. The cam-shifter $E^6$, the connected bar $E^5$, provided with pins, and the cam $D^9$ to actuate the said bar, combined with the pawl E, and with means, substantially as described, to operate the said pawl, as set forth.

17. The cam-shifter $E^6$, the connected bar $E^5$, provided with pins, and the cam $D^9$, and the pawl E and means to move it, combined with the safety-cam and means to operate it, substantially as described, to permit the engagement of the said pawl with and to move the said cam at the proper time, substantially as described.

18. The shaft $C^2$ and means to rotate it, its worm, the pawl E, means to move it, and the cam-wheel $D^9$, combined with the shaft 58, its worm-gear 61, and the cam 57, loosely connected with the hub of the said shaft to operate substantially as described.

19. The series of pattern-wheels, means to rotate them intermittingly, pins 48 and 49, 50 and 51 thereon, the arm $r^6$, provided with projections $r^7$ $r^8$, and the arm $r^9$, having the pin 53, combined with the cam $D^9$, having pins 56, and with the pawl E and means to actuate the said pawl to operate substantially as described.

20. The series of pattern-wheels $n$ $o$ $p$ $q$, provided with teeth and with toothless spaces, as described, the stud $m^2$ to support the said wheels side by side, and the pins or projections thereon to co-operate together and enable one pattern-wheel at the proper time to start in motion another one next to it in succession, combined with the reciprocating pawl $m^5$, extended across all the said wheels, and means to operate it, the said pawl engaging the teeth in the wheel $n$ and thereafter the teeth of the wheels $o$ $p$ $q$ in succession, substantially as described.

21. The pivoted tube 86 to guide the thickening-thread, the rock-shaft 87, the arm 98, link 99, and arm 100, combined with the rock-shaft to which the said arm is connected and the pattern-wheels provided with pins or projections to operate the said arm when it is desired to remove the thickening-thread, substantially as described.

22. The tube 86 to receive the thickening-thread, the rock-shaft 87, the arm 98, attached to the said rock-shaft, the link 99, the arm 100, and the rock-shaft 46, to which it is attached, combined with the latch to engage the said arm 100, and with means, substantially as described, to release the said latch at the proper time and permit the tube 86 to be moved into position to insure the introduction of the thickening-thread carried by it into and between the moving yarns going to the yarn-carrier, substantially as described.

23. The rock-shaft 106, its attached tension-regulating device, the arm 105, link 104, and arm 103, combined with the rock-shaft 44, and with means to operate it at the proper times to cause the tension device to put tension on the yarn, substantially as described.

24. The tube to deliver the thickening-thread and its attached projection 88 to separate the regular knitting-yarns, combined with means to operate the said tube, substantially as described.

25. The radially-grooved bed $h$, the web-holders therein, the cam-plate $C^7$, means to rotate it, and the grooved needle-cylinder and its attached cap-plate $H^{10}$, combined with the cams 37, 38, and 39 on the said cam-plate, the said cams 37 and 38 being provided with projections 40 to act as stops for the web-holders, substantially as described.

26. The needle-cylinder, series of needles therein, the levers $u^2$, the ring, and the post $g^2$ to support the ring, combined with the hand-lever $g$ to lift the said ring to effect the simultaneous elevation of all the said needles in the groove of the said cylinder, as and for the purpose specified.

27. A needle-cylinder, a series of needles arranged thereon, a radially-grooved bed arranged around the lower part of the needle-cylinder, a series of carriages arranged thereon, a series of levers mounted thereon, and means, substantially as described, to move the said carriages horizontally all at once when the needles (arranged in the said cylinder above the ends of the said levers) are to be thrown out of action, as when heels or toes of stockings are to be knitted, or into operation for the production of circular knitting, the cam-carrying wheel or ring, and needle elevating and depressing cams thereon, and a series of carriages $d^2$, levers $u^2$, mounted thereon, a series of connected drivers $c$, guides therefor, and a Jacquard pattern-chain and means to move it to act upon the drivers and move the carriages $d^2$ to place their levers out of the path of movement of the needle-elevating cam, and one or more carriages $e$, levers thereon, a block to which the said carriages are connected, means to move the said block outwardly, and a driver $c^2$ to hold the said block and carriages in with their attached levers out of the range of motion of the needle-elevating cams, while all the other carriages $d^2$ are unacted upon by the Jacquard pattern-chain, thus leaving their levers in position to be struck by the said needle-elevating cams, combined with means, substantially as described, to act upon the driver $c^2$ to release the driver from its engagement with the said block and permit the independent outward movement of the said block and its carriages notwithstanding the pattern-chain is at rest next to the guide holding the said driver, for the purpose described.

In testimony whereof we have signed our names to this specification in the presence of two subscribing witnesses.

ALENZA T. GIFFORD.
C. HERMON FRENCH.

Witnesses:
GEO. W. GREGORY,
F. CUTTER.